United States Patent
DesJardien et al.

(10) Patent No.: US 11,410,122 B1
(45) Date of Patent: Aug. 9, 2022

(54) DETERMINING INVENTORY LEVELS USING SWITCH-EQUIPPED STRIPS AND PATTERNS OF ACTIVATED OR DEACTIVATED INDICATORS

(71) Applicant: Amazon Technologies, Inc., Seattle, WA (US)

(72) Inventors: Matthew Ray DesJardien, Kenmore, WA (US); Kenneth Edward Doe, Carnation, WA (US); Dan Beltzer, Issaquah, WA (US); Andrew James Pierce, Renton, WA (US); Alexander Eugene Choi, Seattle, WA (US); Jacob Drewniak, Seattle, WA (US); Paul Eugene Munger, Seattle, WA (US); Robert M. Riggs, Lynnwood, WA (US); Stavan Dholakia, Shoreline, WA (US); Mike Mosman, Everett, WA (US); Sergio Alfredo Phan Lung Li, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 370 days.

(21) Appl. No.: 16/779,032

(22) Filed: Jan. 31, 2020

(51) Int. Cl.
*G06Q 10/08* (2012.01)
*G06K 7/14* (2006.01)
(Continued)

(52) U.S. Cl.
CPC ......... *G06Q 10/087* (2013.01); *G06K 7/1417* (2013.01); *G06V 10/141* (2022.01);
(Continued)

(58) Field of Classification Search
CPC .... G06Q 10/087; G06K 7/1417; G06V 20/10; F25D 27/00; F25D 29/005; F25D 2500/06
See application file for complete search history.

(56) References Cited

U.S. PATENT DOCUMENTS 7,225,980 B2 6/2007 Ku et al.
7,949,568 B2 5/2011 Fano et al.
(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.
(Continued)

*Primary Examiner* — Laura A Gudorf
(74) *Attorney, Agent, or Firm* — Athorus, PLLC

(57) ABSTRACT

An impulse strip including a plurality of clips, hooks or other features for attaching items to the impulse strip also includes a plurality of switches associated with each of the clips, hooks or other features. The switches are in communication with illuminators or other indicators that are arranged in an array. When an item is loaded onto the strip, or removed from the strip, a switch may be opened or closed, causing one of the illuminators in the array to be activated or deactivated accordingly. An image captured of the illuminators is processed to determine which of the illuminators is activated and which is deactivated, and an inventory level of the strip may be determined based on the statuses of the respective illuminators corresponding to the clips, the hooks or the other features of the impulse strip.

20 Claims, 17 Drawing Sheets

(51) Int. Cl.
*G06V 10/141* (2022.01)
*G06V 20/10* (2022.01)
*F25D 27/00* (2006.01)
*F25D 29/00* (2006.01)

(52) U.S. Cl.
CPC .............. *G06V 20/10* (2022.01); *F25D 27/00* (2013.01); *F25D 29/005* (2013.01); *F25D 2500/06* (2013.01)

(56) References Cited

U.S. PATENT DOCUMENTS

| | | | |
|---|---|---|---|
| 8,009,864 | B2 | 8/2011 | Linaker et al. |
| 8,175,925 | B1 | 5/2012 | Rouaix |
| 8,189,855 | B2 | 5/2012 | Opalach et al. |
| 8,423,431 | B1 | 4/2013 | Rouaix et al. |
| 8,630,924 | B2 | 1/2014 | Groenevelt et al. |
| 8,688,598 | B1 | 4/2014 | Shakes et al. |
| 9,473,747 | B2 | 10/2016 | Kobres et al. |
| 2003/0002712 | A1 | 1/2003 | Steenburgh et al. |
| 2004/0181467 | A1 | 9/2004 | Raiyani et al. |
| 2008/0055087 | A1 | 3/2008 | Horii et al. |
| 2008/0077511 | A1 | 3/2008 | Zimmerman |
| 2008/0109114 | A1 | 5/2008 | Orita et al. |
| 2009/0121017 | A1 | 5/2009 | Cato et al. |
| 2009/0245573 | A1 | 10/2009 | Saptharishi et al. |
| 2011/0011936 | A1 | 1/2011 | Morandi et al. |
| 2012/0284132 | A1 | 11/2012 | Kim et al. |
| 2013/0076898 | A1 | 3/2013 | Philippe et al. |
| 2013/0253700 | A1 | 9/2013 | Carson et al. |
| 2014/0279294 | A1 | 9/2014 | Field-Darragh et al. |
| 2014/0362223 | A1 | 12/2014 | LaCroix et al. |
| 2015/0019391 | A1 | 1/2015 | Kumar et al. |
| 2015/0073907 | A1 | 3/2015 | Purves et al. |
| 2018/0336513 | A1* | 11/2018 | Smith ................. G05B 19/406 |
| 2020/0118154 | A1* | 4/2020 | Schumacher ...... G06Q 30/0223 |
| 2021/0019693 | A1* | 1/2021 | Gu .......................... G06T 7/292 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

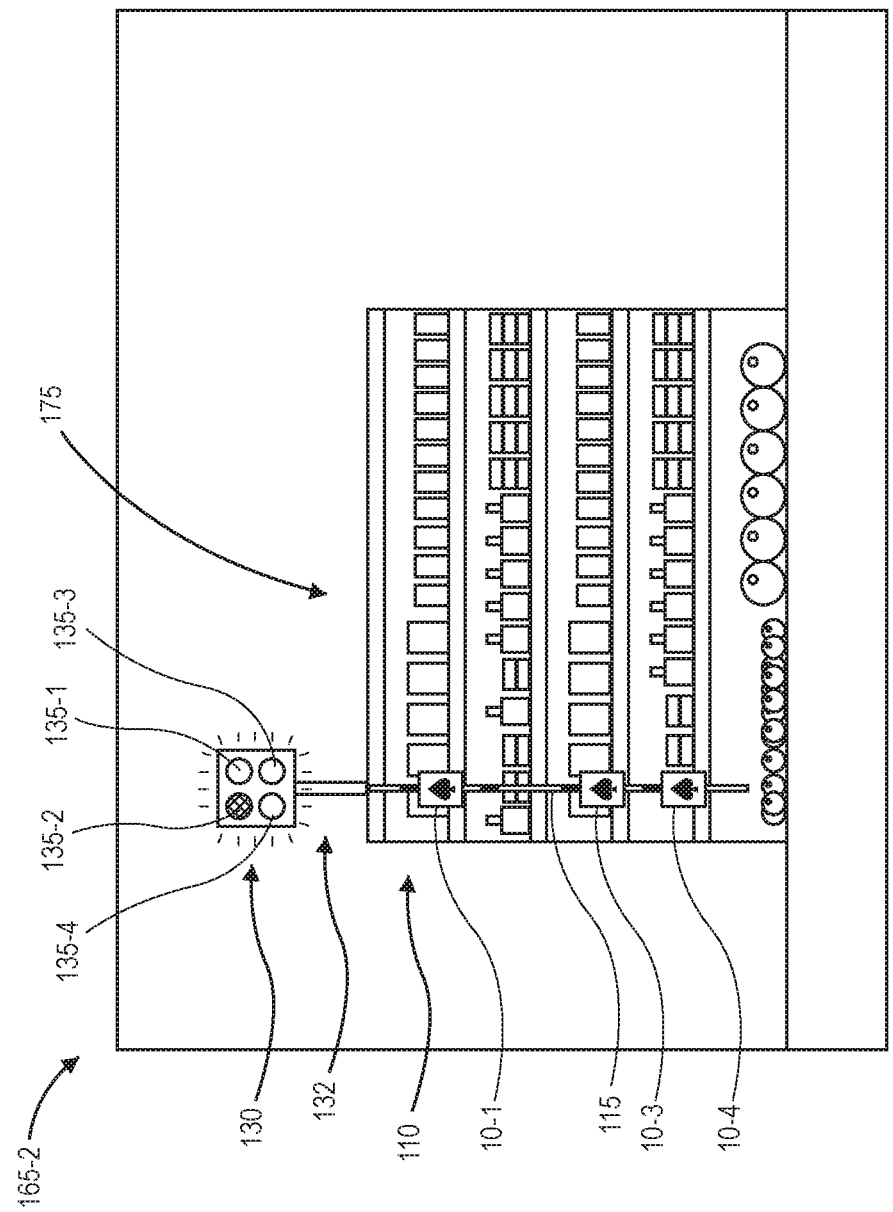

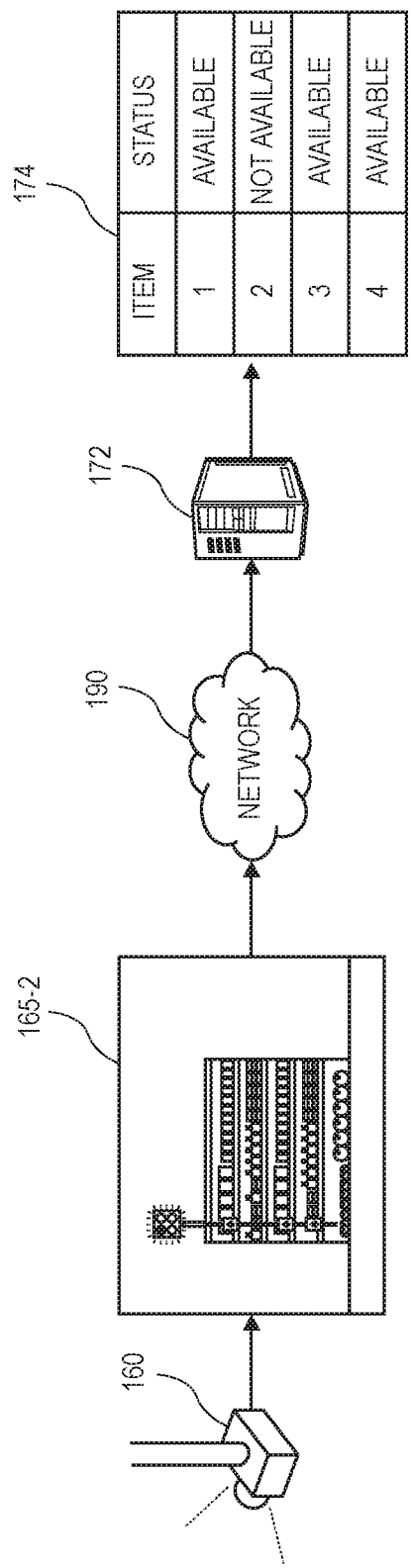

DETERMINING INVENTORY LEVELS USING SWITCH-EQUIPPED STRIPS AND PATTERNS OF ACTIVATED OR DEACTIVATED INDICATORS

BACKGROUND

Today, high-technology systems are being incorporated into traditional bricks-and-mortar commercial settings. For example, in a materials handling facility, such as a retail store or establishment, a digital camera may be provided in one or more locations and configured to include portions of the materials handling facility within its field of view. Images captured by the digital camera may be processed to identify one or more customers or other personnel within the materials handling facility, to detect movements of such customers or personnel, or to identify items that are removed from storage units by such customers or personnel, or placed on such storage units by such customers or personnel. Additionally, one or more load sensors may be provided in association with one or more storage units within a materials handling facility, e.g., beneath shelves or other surfaces of the materials handling facility.

An impulse strip, which is sometimes called a "merchandising strip," an "impulse merchandising strip," a "display strip," a "hang strip" or a "hook strip," is a storage unit that is configured to present items to customers in a hanging manner. An impulse strip typically includes a plurality of clips, hooks, or other systems for affixing or holding items to the impulse strip, commonly in series, and in a substantially vertical manner. An impulse strip can be mounted or attached to any surface and suspended therefrom with one or more items loaded thereon, e.g., by such clips, hooks or other systems. In some materials handling facilities, an impulse strip may be mounted or attached to a more rigid (e.g., substantially permanent) storage unit, and loaded with items that complement those that are placed on or within the more rigid storage unit, e.g., ice cream scoops adjacent to coolers having ice cream, bamboo skewers near meats or vegetables that may be formed into a shish kebab and cooked in concert, or clips near bags of potato chips that may be sealed with such clips. In some other materials handling facilities, an impulse strip may be mounted or attached in such a manner that items that are loaded onto the impulse strip remain within a field of view of one or more customers. The items that are loaded onto an impulse strip may also be temporally relevant, feature attractive packaging, or have characteristics that permit such items to be adequately presented in ambient environmental conditions within a materials handling facility.

By their very nature, impulse strips are constructed in a somewhat primitive manner. Impulse strips are generally flexible, not rigid, devices that have limited masses and are not electrically powered. For this reason, automating transactions involving items that are loaded onto impulse strips has not been feasible.

BRIEF DESCRIPTION OF THE DRAWINGS

FIGS. 1A through 1H are views of aspects of one system for determining inventory levels in accordance with implementations of the present disclosure.

DETAILED DESCRIPTION

As is set forth in greater detail below, the present disclosure is directed to strips (e.g., impulse strips) that include mounting features that are equipped with switches that are mechanically associated with components for releasably coupling, mounting or fastening items to the strips, or holding items on the strips, and electrically coupled to a set of indicators, such as illuminators (e.g., lights), that are arranged in a known arrangement or configuration, such as an array. The switches may be configured to cause the set of indicators to be activated or deactivated in a manner that indicates a respective loading condition of one of the components. Accordingly, where the arrangement or configuration of the indicators is aligned within a field of view of an imaging device, images captured by the imaging device may be processed to determine a loading condition of the strip as a whole, or a loading condition of any of the respective components, by detecting a pattern of the activated or deactivated indicators depicted within such images. Records of inventory levels on one or more strips may be updated accordingly where changes in the loading condition of the strip, represented as changes in the visible appearance of the pattern of indicators, are detected within imaging data.

Figure 1A:
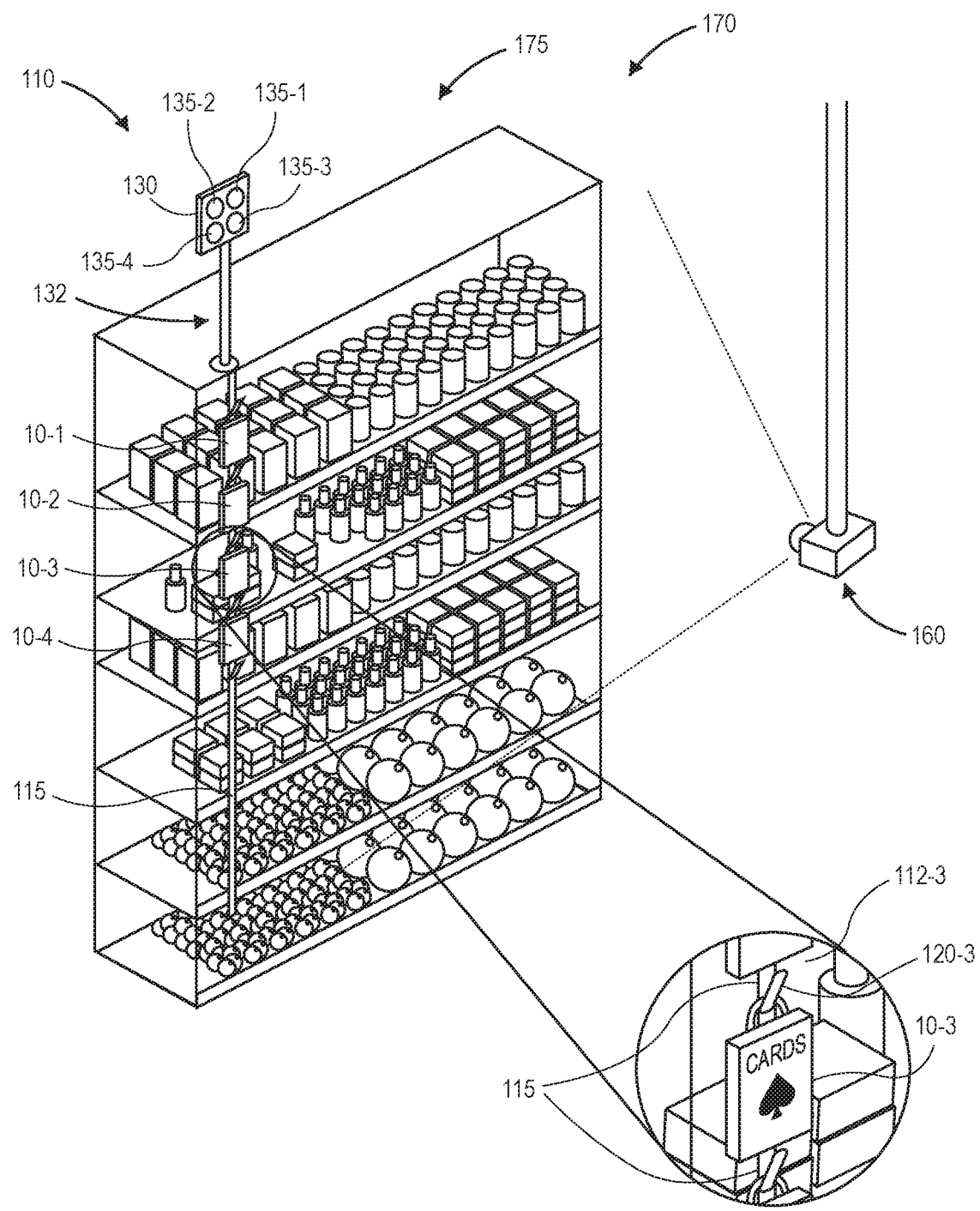

Referring to FIGS. 1A through 1H, views of aspects of one system for determining inventory levels in accordance with implementations of the present disclosure are shown. As is shown in FIG. 1A, an item distribution system 110 is mounted to a storage unit 175 (e.g., a set of inventory shelves) that is within a field of view of an imaging device 160 (e.g., a digital camera) in a materials handling facility 170, which may be any indoor or outdoor retail store or other establishment having an open or enclosed environment or space in which any number of actors (e.g., humans, other animals or machines) may execute one or more poses, gestures or other actions.

The item distribution system 110 includes a strip 115 (e.g., an impulse strip, or a merchandising strip) that is mounted to an upper level or shelf of the storage unit 175 and a display unit (or housing, frame, or other structure or component) 130 that is mounted above the storage unit 175 by a support (e.g., a stanchion) 132. The display unit 130 may be mounted at any height above the storage unit 175, such as one foot, two feet, three feet, six feet, or ten feet, or any other height above the storage unit 175, and aligned at any angle. The strip 115 may be formed from any materials (e.g., metals, plastics or others), and may comprise a chain having one or more links, a single piece of plastic, or any other type or form of component having a length that is substantially greater than a width or a depth (or thickness).

A plurality of items 10-1, 10-2, 10-3, 10-4 (viz., decks of playing cards) are releasably coupled, mounted or fastened to the strip 115, or held on the strip 115, e.g., by a plurality of clips, hooks or other features that may releasably attach or hold boxes or other containers of each of the items 10-1, 10-2, 10-3, 10-4 to the strip 115 at discrete locations, such that pairs of the clips, hooks or other features (or the discrete locations) are separated by a common distance therebetween, or different distances. The display unit 130 includes a plurality of illuminators 135-1, 135-2, 135-3, 135-4 arranged in an arrangement or configuration (e.g., an array) having a known number of columns and rows, or in any other arrangement or configuration. Each of the illuminators 135-1, 135-2, 135-3, 135-4 is associated with one of the items 10-1, 10-2, 10-3, 10-4, and is visible through or within a front face of the display unit 130, which is aligned substantially vertically. Alternatively, the display unit 130 may be aligned in any other manner, and with the front face of the display unit 130 aligned in or parallel to any plane.

Additionally, each of the illuminators 135-1, 135-2, 135-3, 135-4 is activated (e.g., emitting visible light) with the items 10-1, 10-2, 10-3, 10-4 loaded onto the strip 115. Alternatively, or additionally, the display unit 130 may include indicators that need not require or operate based on the emission of light therefrom. For example, one or more of the illuminators 135-1, 135-2, 135-3, 135-4 may be replaced by objects having different or opposing types or forms of markings, colors or other visible features thereon, such as spheres, cubes, pyramids or other objects having flat or rounded faces.

For example, as is shown in FIG. 1A, the item 10-3 is releasably coupled, mounted or fastened to the strip 115 or held on the strip 115 by a clip 112-3, which may be biased into or toward the strip 115 by one or more springs or other biasing elements. The clip 112-3 includes a switch 120-3 for opening or closing an electrical circuit or connection when the item 10-3 is releasably coupled, mounted or fastened to the strip 115 or held on the strip 115, or for closing or opening the electrical circuit or connection when the item 10-3 is decoupled or removed from the strip 115. Additionally, the switch 120-3 is electrically coupled with one of the illuminators 135-3 corresponding to the clip 112-3, such that the one of the illuminators 135-3 is activated when the item 10-3 is releasably coupled, mounted or fastened to the strip 115 or held on the strip 115 via the clip 112-3. Each of the items 10-1, 10-2, 10-4 may be releasably coupled, mounted or fastened to the strip 115 or held on the strip 115 in a manner similar to that which is shown in FIG. 1A for the item 10-3, or in any other manner.

Figure 1B:
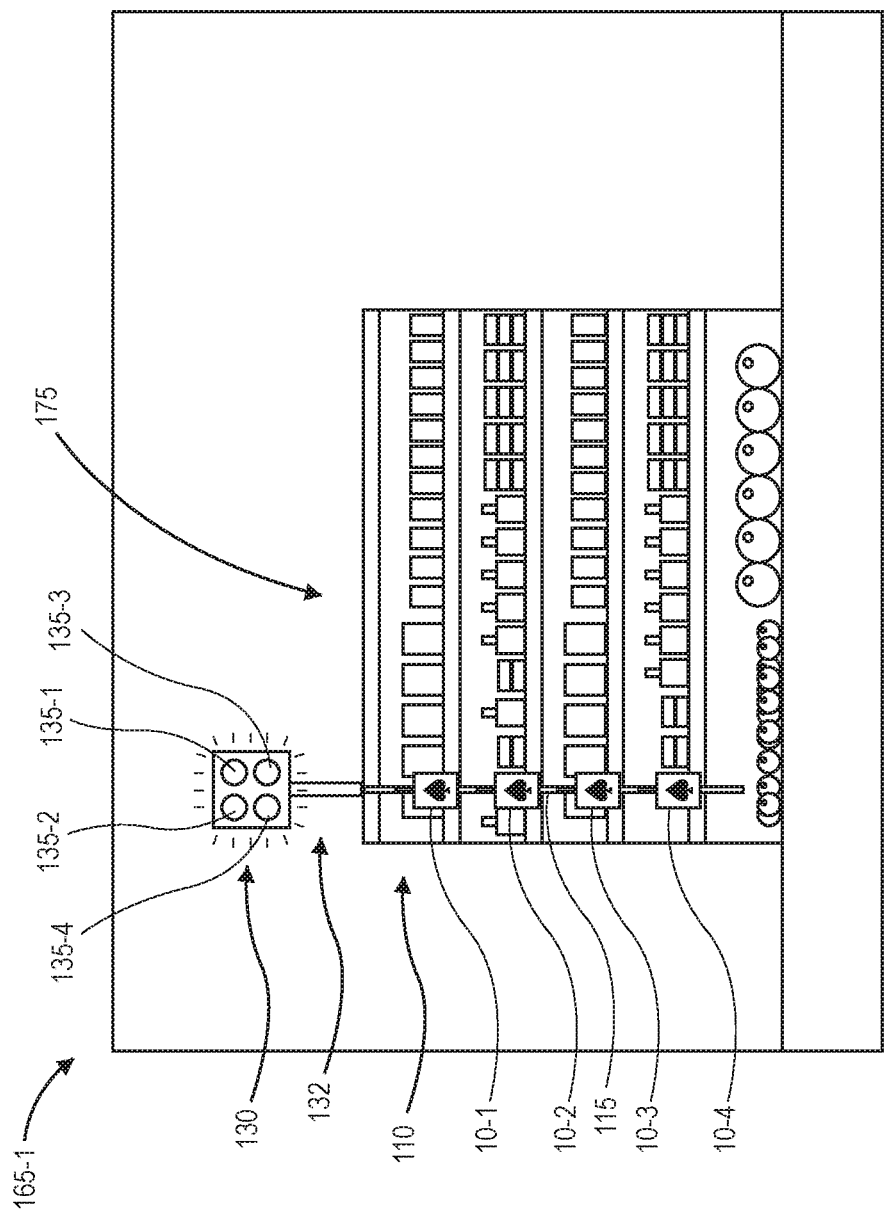

As is shown in FIG. 1A, the item distribution system 110 and the storage unit 175 are aligned within a field of view of the imaging device 160, which may be configured to capture visual images (e.g., color, grayscale or black-and-white) at any frame rate. As is shown in FIG. 1B, an image 165-1 captured using the imaging device 160 depicts a frontal face or region of the storage unit 175, including the items 10-1, 10-2, 10-3, 10-4 loaded on the strip 115 and the display unit 130 including the illuminators 135-1, 135-2, 135-3, 135-4 above the strip 115. The image 165-1 indicates that each of the illuminators 135-1, 135-2, 135-3, 135-4 is activated.

In accordance with implementations of the present disclosure, a loading condition of an impulse strip, or a merchandising strip, e.g., the strip 115, may be determined by capturing imaging data using an imaging device including a set of indicators, e.g., the illuminators 135-1, 135-2, 135-3, 135-4, associated with the impulse strip within a field of view, e.g., the imaging device 160. A loading condition of the impulse strip may be determined by recognizing that any of the indicators is activated or deactivated, or by recognizing a pattern of the activated or deactivated indicators within the imaging data.

Figure 1C:
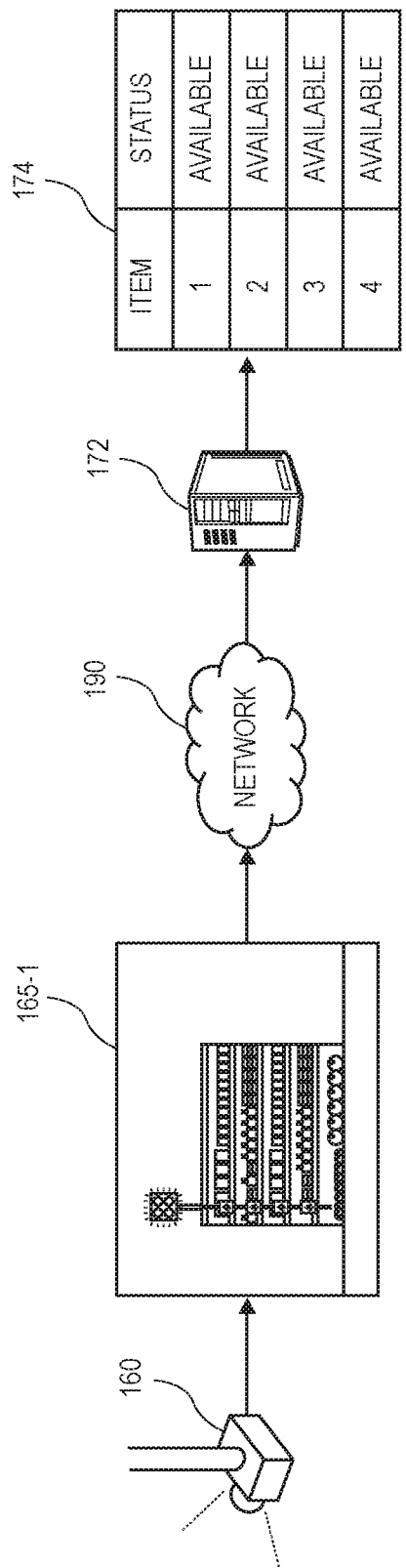

As is shown in FIG. 1C, the imaging device 160 transmits the image 165-1 to a server 172 associated with the materials handling facility 170 over a network 190, which may include the Internet in whole or in part. The server 172 may reside external to the imaging device 160, such as in one or more alternate or virtual locations, e.g., in a "cloud"-based environment.

As is also shown in FIG. 1C, the server 172 includes a data record 174 of the level of inventory on the strip 115 stored thereon. In some implementations, the data record 174 may be generated or determined based on the image 165-1. For example, the server 172 may be programmed to detect the individual illuminators 135-1, 135-2, 135-3, 135-4 and determine whether such illuminators are activated or deactivated, or to recognize specific patterns of illumination for the illuminators 135-1, 135-2, 135-3, 135-4 within images received from the imaging device 160, and to associate such patterns with levels of inventory stored on the strip 115, such as where such items are homogenous, fungible or identical in nature. As yet another example, the server 172 may be programmed to recognize the presence of illumination, or the absence of illumination, in locations within an image plane corresponding to one or more of the illuminators 135-1, 135-2, 135-3, 135-4, and to determine a level of inventory on the strip 115 based on the presence or absence of illumination at such locations. In some implementations, each of the illuminators 135-1, 135-2, 135-3, 135-4 may operate in a similar manner, and may be configured to emit light, or to not emit light, when one of the clips, hooks or other features was loaded with, or was not loaded with, one of the items 10-1, 10-2, 10-3, 10-4. In some other implementations, however, each of the illuminators 135-1, 135-2, 135-3, 135-4 may be configured to emit light at different wavelengths (or colors or frequencies), or at different intensities, based on whether a corresponding clip, hook or other feature was loaded with, or was not loaded with, an item. The server 172 may be configured to detect and recognize light emitted by any of the illuminators 135-1, 135-2, 135-3, 135-4, and under any circumstances, in accordance with the present disclosure. Alternatively, in some implementations, any of the tasks or functions described herein as being performed by the server 172 may be performed by one or more processors or processor units residing on the imaging device 160.

In some implementations, the data record 174 may be initially generated or programmed by one or more users or computer devices, and subject to revisions based on changes in the status of one or more of the illuminators 135-1, 135-2, 135-3, 135-4 within the display unit 130. In some other implementations, however, the data record 174 may be initially established based on a first image captured by the imaging device 160, and subject to revisions based on changes in the status of one or more of the illuminators 135-1, 135-2, 135-3, 135-4.

Figure 1D:
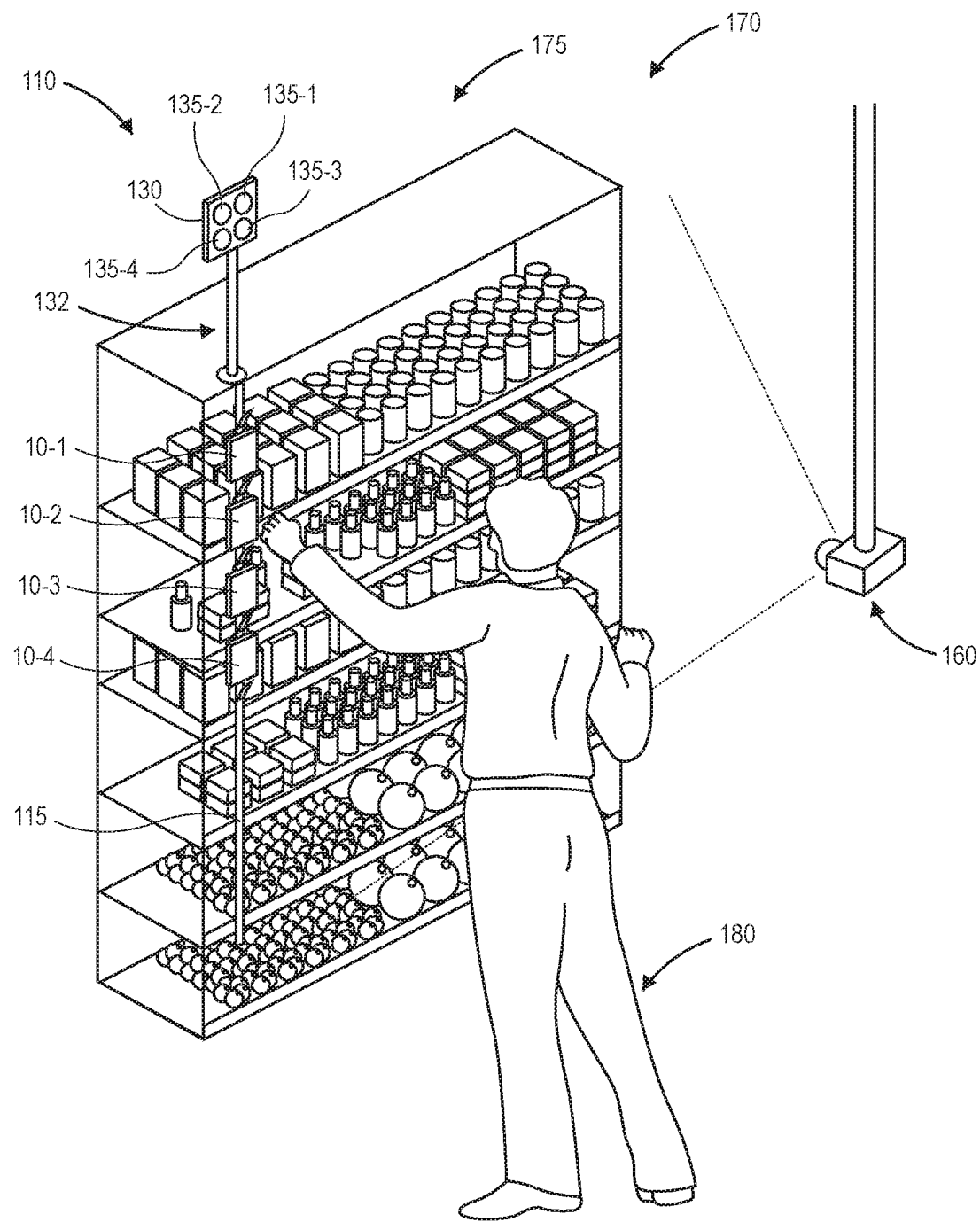
Figure 1E:
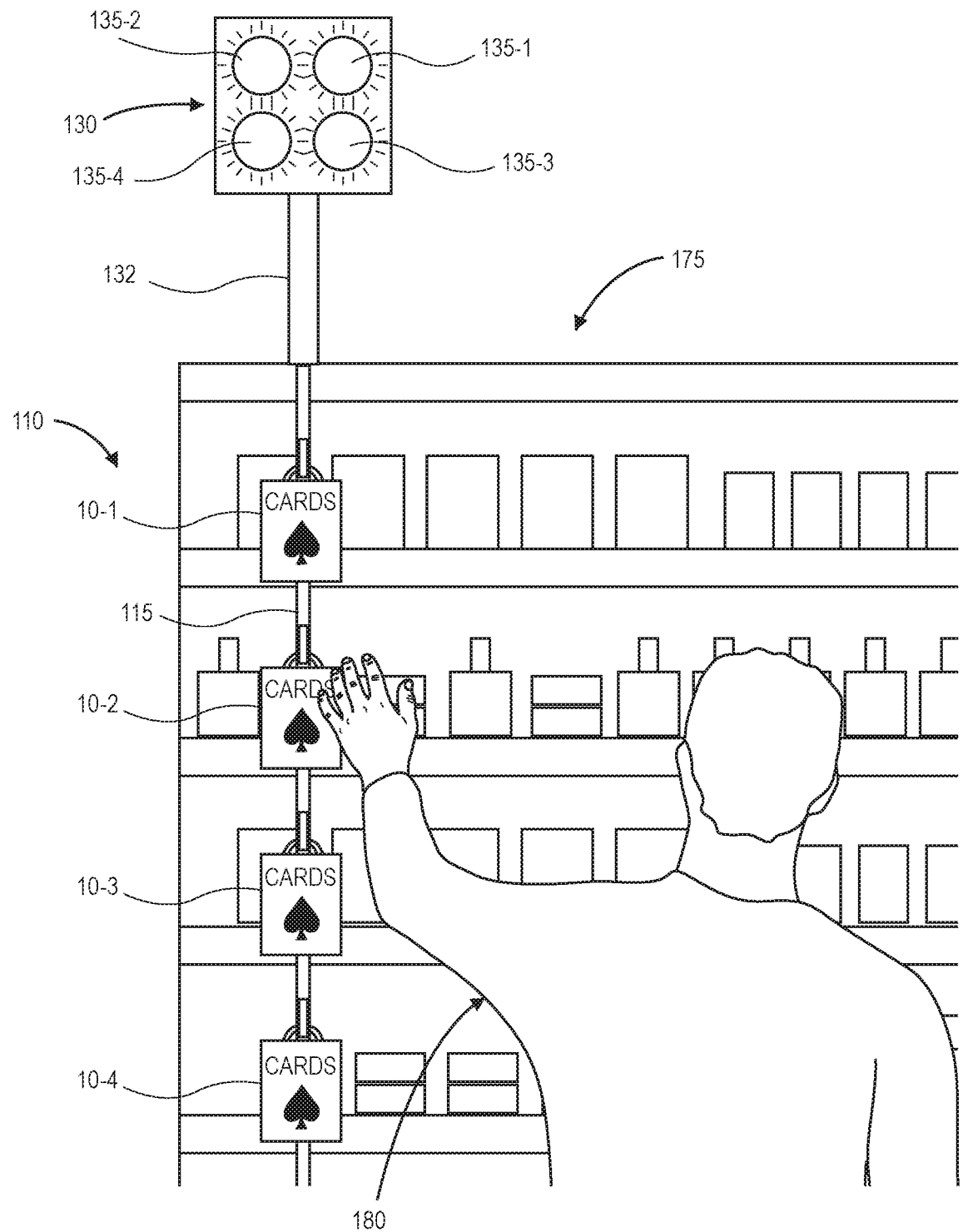
Figure 1F:
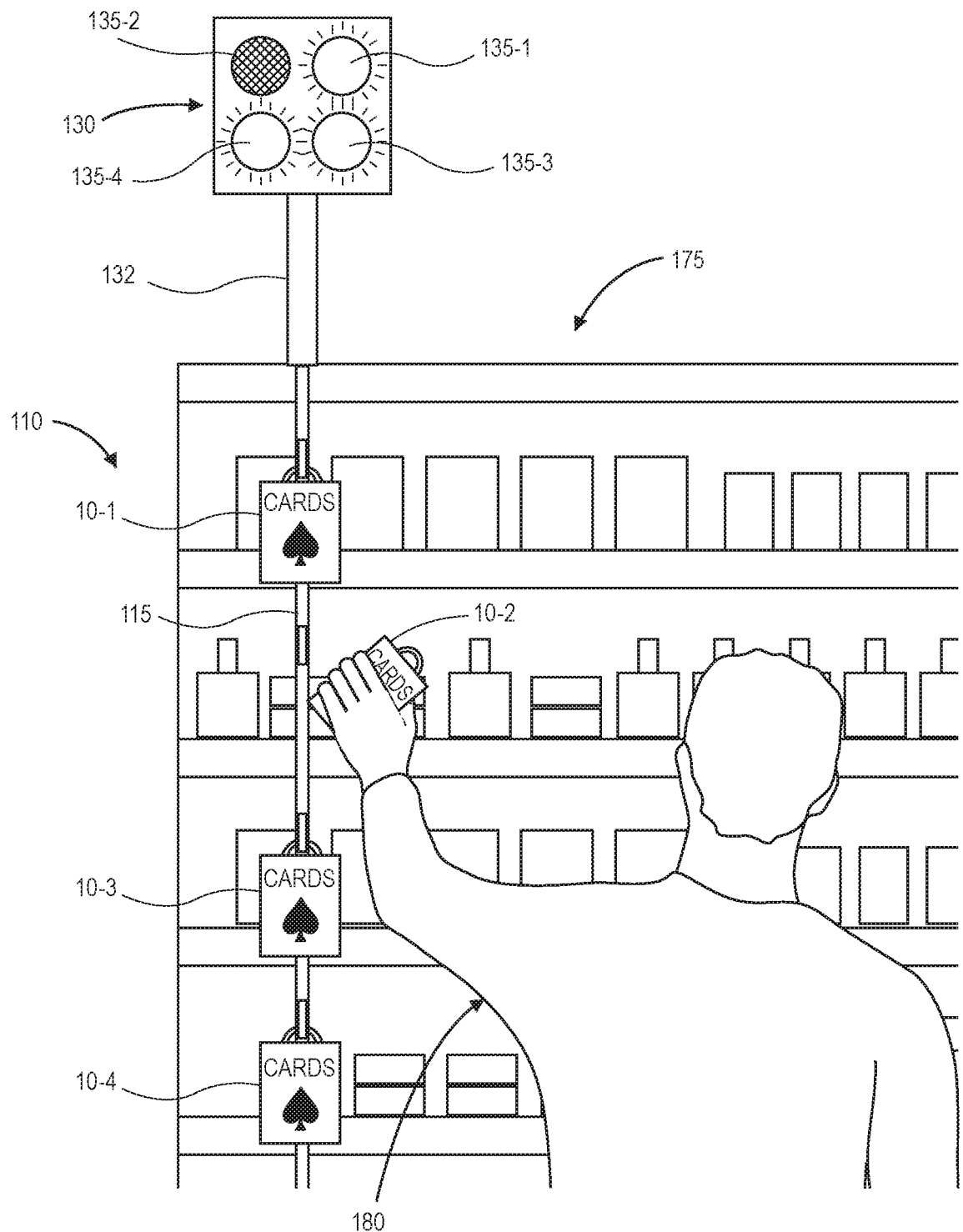

As is shown in FIGS. 1D and 1E, a customer 180 may approach the item distribution system 110 and attempt to retrieve one of the items 10-2 from the strip 115, e.g., by extending one or both hands toward the strip 115, and manipulating a clip 112-2 (or a hook or another feature) for releasably coupling, mounting or fastening the item 10-2 onto the strip 115 or holding the item 10-2 on the strip 115 in a discrete location. With the item 10-2 on the strip 115, the illuminator 135-2 within the display unit 130 corresponding to the item 10-2 remains activated (e.g., illuminated). As is shown in FIG. 1F, however, after the customer 180 has removed the item 10-2 from the strip 115, e.g., by operating the clip 112-2 to release the item 10-2 therefrom, the illuminator 135-2 is deactivated (e.g., not illuminated).

As is shown in FIG. 1G, an image 165-2 captured using the imaging device 160 depicts the frontal face or region of the storage unit 175, including the items 10-1, 10-3, 10-4 loaded on the strip 115 after the item 10-2 has been removed therefrom. Additionally, the image 165-2 also indicates that each of the illuminators 135-1, 135-3, 135-4 is activated, and that the illuminator 135-2 is not activated.

As is shown in FIG. 1H, the imaging device 160 transmits the image 165-2 to the server 172 over the network 190. In response to determining that the illuminator 135-2 is not depicted as being illuminated within the image 165-2, the server 172 updates the data record 174 to indicate that the item 10-2 is no longer available. Alternatively, in some implementations, the imaging device 160 may determine that the illuminator 135-2 is not depicted as being illuminated within the image 165-2, and may transmit an indication that the item 10-2 is no longer available to the server 172.

Accordingly, the systems and methods of the present disclosure may be directed to determining inventory levels on switch-equipped strips (e.g., impulse strips or merchandising strips) to which one or more items may be mounted or otherwise affixed. The strips may include clips, hooks or other features for mounting or affixing items to the strips, or for holding the items on the strips, and each of such clips, hooks or other features may have one or more switches that are electrically coupled to an indicator (e.g., an illuminator), such that an indicator may be activated (or deactivated) or shown in a first condition when an item is mounted or affixed to a corresponding one of the clips, the hooks or the other features, or held thereby, and deactivated (or activated) or shown in a second condition when the item is removed from the corresponding one of the clips, the hooks or the other features.

The indicators of the present disclosure may be any systems or components that are configured to visibly identify or express a status of a clip, a hook or another feature in a discrete location on a strip, such as by emitting light at any wavelength (or color or frequency). For example, the indicators may be individually addressable illuminators such as incandescent bulbs, fluorescent bulbs of any size or shape (e.g., compact fluorescent bulbs), light emitting diodes (or "LED"), or the like, and may receive power from a single power source within a display unit, a housing, a frame, or another structure or component, or from one or more power sources. For example, in some implementations, the indicators may be powered by any type, size or form of dry cell or wet cell battery having positive and negative cells and corresponding terminals or electrodes. Such a battery may be a lead-acid battery, a lithium ion battery, a nickel cadmium battery or a nickel metal hydride battery, or any other type, size or form of battery or other power cell (e.g., AAA, AA, C or D batteries). Alternatively, the indicators may be powered by any other type, size or form of power source, including but not limited to or more solar cells or fuel cells.

Additionally, the indicators may be provided within a display unit, a housing, a frame, or another structure or component in an arrangement or configuration that may take any form. For example, the indicators may be provided in an array having any number of rows and columns, in a manner similar to a traditional athletic scoreboard or other indoor or outdoor electric display. Alternatively, the indicators may be arranged in any other linear, curvilinear, or polygonal shape, e.g., in a single line, or in a shape formed from a single line. Moreover, in some implementations, each of the indicators in an arrangement or configuration may be configured to identify or express statuses of clips, hooks or other features in the same manner, or in different manners. For example, where the indicators are illuminators, the illuminators may be configured to emit light at the same wavelength (or color or frequency), or at the same intensity. Alternatively, the illuminators in an arrangement or configuration may be configured to emit light at different wavelengths (or colors or frequencies), or at different intensities. Moreover, the display unit, the housing, the frame or the other structure or component may be aligned in any manner and at any angle or orientation, such that one or more indicators provided therein are aligned in or parallel to any plane.

Where positions of indicators corresponding to discrete locations on a strip (e.g., an impulse strip, or a merchandising strip) are known, an inventory level on the strip may be determined based on the visually determined conditions or statuses of such indicators, e.g., whether an indicator corresponding to a discrete location on the strip is activated or deactivated. For example, where a display unit, a housing, a frame, or another structure or component having a plurality of indicators provided in a known arrangement or configuration is aligned within a field of view of one or more imaging devices, images captured by the imaging devices at any frame rate may be processed to determine which of the indicators is activated, or in a first condition, or which of the indicators is not activated, or in a second condition. An inventory level of the strip may be determined based on the activated (or deactivated) indicators in an arrangement or configuration, as determined based on the images.

The strips of the present disclosure may be formed from any suitable materials in accordance with the present disclosure. For example, the strips may be formed from metals (e.g., steels, aluminums, or others), plastics (e.g., polyethylenes of various densities), composites, or any other materials. In some implementations, the strips may be chains, socket holders or any other objects having any number of segments of various lengths. In some other implementations, the strips may be single, contiguous units formed from one or more materials (e.g., plastics). Additionally, the strips of the present disclosure may include any type or form of system or component for releasably coupling, mounting or fastening items thereto or held thereby in discrete locations, including but not limited to clips (e.g., spring-biased clamping devices), hooks, or other features. Such systems or components may be formed integral to the strips, or joined to the strips in any manner, e.g., by rivets, welding, glues, adhesives or any other technique. Moreover, the strips of the present disclosure may further include one or more hooks or other features for joining the strips to one or more other components, including but not limited to one or more surfaces associated with a storage unit (e.g., a shelving unit, a temperature-controlled cooler or other container, a gondola rack), a wall, a ceiling or any other aspect of a materials handling facility. In some implementations, the hooks or other features may be provided at or near one end of a strip, thereby permitting the strip to hang or dangle vertically downward with any number of items releasably coupled, mounted or fastened thereto or held thereby.

The clips, hooks or other features for releasably coupling, mounting or fastening items to strips, or holding the items on the strips, in discrete locations may include one or more switches integrated therein or associated therewith. In some implementations, each of the switches of the present disclosure may be configured to open when an item is releasably coupled, mounted or fastened to the strip or held on the strip at a discrete location, or to close when the item is removed from the strip at the discrete location. Alternatively, in some other implementations, each of the switches of the present disclosure may be configured to close when an item is releasably coupled, mounted or fastened to the strip or held on the strip at a discrete location, or to open when the item is removed from the strip at the discrete location. Where a switch is electrically coupled to an indicator, e.g., an illuminator, and an item is releasably coupled, mounted or fastened to a clip, a hook or another feature associated with the switch, or held on the clip, the hook or the other feature, the indicator may be activated or deactivated accordingly.

In addition to switches, or as alternatives to switches, a strip may include any number of other systems or components that are configured to operate when an item is releasably coupled, mounted or fastened to a strip or held on the strip at a discrete location, or removed therefrom. For example, one or more strips of the present disclosure may include or incorporate non-contact switches, capacitor plates, Hall effect sensors, or other systems or components, which may be electrically coupled to an indicator and configured to activate or deactivate the indicator, as necessary.

Those of ordinary skill in the pertinent arts will recognize that imaging data, e.g., visual imaging data, depth imaging data, infrared imaging data, radiographic imaging data, or imaging data of any other type or form, may be captured using one or more imaging devices such as digital cameras, depth sensors, range cameras, infrared cameras or radiographic cameras. Such devices generally operate by capturing light that is reflected from objects, and by subsequently calculating or assigning one or more quantitative values to aspects of the reflected light, e.g., image pixels, then generating an output based on such values, and storing such values in one or more data stores. For example, a digital camera may include one or more image sensors (e.g., a photosensitive surface with a plurality of pixel sensors provided thereon), having one or more filters associated therewith. Such sensors may detect information regarding aspects of any number of image pixels of the reflected light corresponding to one or more base colors (e.g., red, green or blue) of the reflected light, or distances to objects from which the light was reflected. Such sensors may then generate data files including such information, and store such data files in one or more onboard or accessible data stores (e.g., a hard drive or other like component), or in one or more removable data stores (e.g., flash memory devices). Such data files may also be printed, displayed on one or more broadcast or closed-circuit television networks, or transmitted over a computer network as the Internet.

An imaging device that is configured to capture and store visual imaging data (e.g., color images) is commonly called an RGB ("red-green-blue") imaging device (or camera), while an imaging device that is configured to capture both visual imaging data and depth imaging data (e.g., ranges) is commonly referred to as an RGBz or RGBD imaging device (or camera). Imaging data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

Similarly, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Information and/or data regarding features or objects expressed in imaging data, including colors, textures or outlines of the features or objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color candy apple red is expressed as #FF0800. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations (e.g., intervals of time). Such algorithms or tools may be directed to recognizing and marking transitions (e.g., the contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny detectors or algorithms; Sobel operators, algorithms or filters; Kayyali operators; Roberts detection algorithms; Prewitt operators; Frei-Chen methods; or any other algorithms or techniques that may be known to those of ordinary skill in the pertinent arts. For example, objects or portions thereof expressed within imaging data may be associated with a label or labels according to one or more machine learning classifiers, algorithms or techniques, including but not limited to nearest neighbor methods or analyses, artificial neural networks, support vector machines, factorization methods or techniques, K-means clustering analyses or techniques, similarity measures such as log likelihood similarities or cosine similarities, latent Dirichlet allocations or other topic models, or latent semantic analyses.

As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. For example, in some implementations, one or more of the systems and methods disclosed herein may be used to detect interactions within a materials handling facility, including but not limited to interactions with one or more items (e.g., consumer goods) within the materials handling facility.

Figure 2:
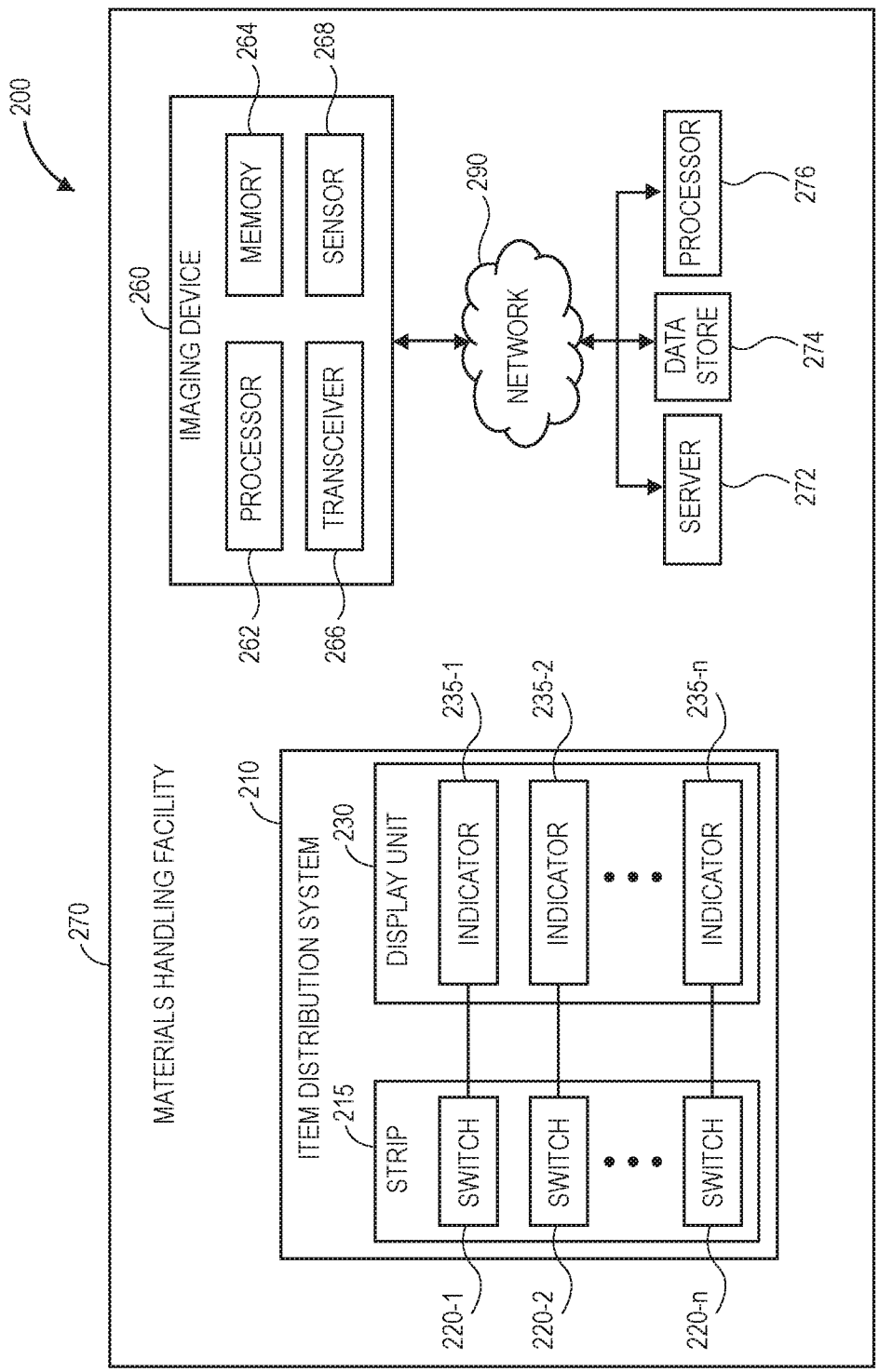
FIG. 2 is a block diagram of components of one system for determining inventory levels in accordance with implementations of the present disclosure.

Referring to FIG. 2, a block diagram of components of one system 200 for determining inventory levels in accordance with implementations of the present disclosure is shown. The system 200 includes an item distribution system 210 and an imaging device 260 within a materials handling facility 270. The imaging device 260 and the materials handling facility 270 include one or more computer devices or components that are connected to one another across a network 290, which may include the Internet in whole or in part. Except where otherwise noted, reference numerals preceded by the number "2" shown in FIG. 2 indicate components or features that are similar to components or features having reference numerals preceded by the number "1" shown in FIGS. 1A through 1H.

The item distribution system 210 may be any system or component for distributing items via a strip 215, such as an impulse strip, a merchandising strip, an impulse merchandising strip, a display strip, a hang strip, a hook strip, or any other like system that is typically configured to present items to customers in a hanging manner. The strip 215 of the item distribution system 210 of FIG. 2 includes a plurality of switches 220-1, 220-2 . . . 220-$n$. Additionally, the item distribution system 210 includes a display unit 230 (or housing, frame or other structure or component) having a plurality of indicators 235-1, 235-2 . . . 235-$n$, which may be presented in an array, a grid, a matrix, or in any other spatial arrangement or configuration within the display unit 230.

Each of the switches 220-1, 220-2 . . . 220-$n$ is mounted in association with a clip, a hook, or another feature for releasably coupling, mounting or fastening one or more items at a discrete location on the strip 215, or for holding the one or more items at a discrete location on the strip 215. In some implementations, the clips, the hooks or the other features of the strip 215 may include contacts or contact points that form all or portions of the respective ones of the switches 220-1, 220-2 . . . 220-$n$, thereby completing or opening electrical circuits for activating or deactivating corresponding ones of the indicators 235-1, 235-2 . . . 235-$n$ of the display unit 230 when items are placed on or held by the clips, the hooks or the other features of the strip 215, or removed from such clips, such hooks or such other features. Alternatively, one or more of the switches 220-1, 220-2 . . . 220-$n$ may operate in a non-contact manner, or may include or comprise capacitor plates, Hall effect sensors, or other systems or components for activating or deactivating the corresponding ones of the indicators 235-1, 235-2 . . . 235-$n$.

The indicators 235-1, 235-2 . . . 235-$n$ may be any systems or components for visibly indicating a status of a one or more clips, hooks or other features, e.g., in response to activation or deactivation by one of the switches 220-1, 220-2 . . . 220-$n$. For example, in some implementations, the indicators 235-1, 235-2 . . . 235-$n$ may be illuminators that are configured to emit light at any wavelength (or color or frequency) or intensity. In some implementations, the indicators 235-1, 235-2 . . . 235-$n$ may include one or more incandescent bulbs, fluorescent bulbs of any size or shape (e.g., compact fluorescent bulbs), LEDs, or the like. The item distribution system 210 may include any number of indicators 235-1, 235-2 . . . 235-$n$. In some implementations, such as is shown in FIG. 2, the item distribution system 210 includes at least as many indicators 235-1, 235-2 . . . 235-$n$ as the number of the switches 220-1, 220-2 . . . 220-$n$.

Additionally, in some implementations, each of the indicators 235-1, 235-2 . . . 235-$n$ may be of the same type (e.g., incandescent bulbs, fluorescent bulbs, LEDs), and may be configured to emit light at the same wavelength (or color or frequency) or intensity. In some other implementations, however, each of the indicators 235-1, 235-2 . . . 235-$n$ may be of different types, or may be configured to emit light at different wavelengths (or colors or frequencies) or intensities.

Alternatively, or additionally, one or more of the indicators 235-1, 235-2 . . . 235-$n$ may be systems or components that are configured to visibly indicate a status of one or more clips, hooks or other features in any manner other than, or in addition to, the emission of light. For example, in some implementations, the indicators 235-1, 235-2 . . . 235-$n$ may include one or more objects having at least two discrete markings, colors or other visible features, such as objects that are formed from wood, metal, plastic, stone or any other materials. In such implementations, the indicators 235-1, 235-2 . . . 235-$n$ may be configured to rotate or otherwise be repositioned, e.g., in response to activation or deactivation by a corresponding one of the switches 220-1, 220-2 . . . 220-$n$, in order to present a unique, visible indication of a status of a clip, a hook or another feature provided on the strip 215, e.g., one of the markings, colors or other visible features rendered thereon. Alternatively, the indicators 235-1, 235-2 . . . 235-$n$ may include or correspond to one or more portions of a display, e.g., an electronic ink display within the display unit 230, that may be configured in response to activation or deactivation by one of the switches 220-1, 220-2 ... 220-*n*. For example, a change in a position of one of the switches 220-1, 220-2 ... 220-*n* may apply an electric charge to a portion of an electronic ink display, or remove the electronic charge from the portion of the electronic ink display, thereby activating or deactivating the portion of the electronic ink display accordingly.

Moreover, the indicators 235-1, 235-2 ... 235-*n* may be provided within the display unit 230 in any arrangement or configuration. For example, in some implementations, the indicators 235-1, 235-2 ... 235-*n* may be provided in an array, a grid, a matrix, or in any other spatial arrangement or configuration (e.g., any other linear, curvilinear, or polygonal shape) defined by a geometric configuration or construction of the display unit 230. Additionally, the indicators 235-1, 235-2 ... 235-*n* may be configured to receive power from one or more power supplies, which may include but are not limited to batteries of any type, size or form, or any other power source, e.g., solar cells or fuel cells. Such power supplies may be provided within the display unit 230 along with the indicators 235-1, 235-2 ... 235-*n*, or external to the display unit 230.

The imaging device 260 (or other sensor) may be any form of optical recording device that may be used to photograph or otherwise record imaging data, including visual imaging data (e.g., color, grayscale or black-and-white images), depth imaging data, or any other type of imaging data. For example, in some implementations, the imaging device 260 may be an RGB color camera, a still camera, a motion capture/video camera or any other type or form of camera. In other implementations, the imaging device 260 may be a thermographic or infrared (IR) camera. Additionally, the imaging device 260 may be mounted in any specific location or orientation, e.g., within the materials handling facility 210. In some implementations, the imaging device 260 may include the indicators 235-1, 235-2 ... 235-*n* and, alternatively or additionally, one or more inventory areas or stations (e.g., storage units, including but not limited to the strip 215) for receiving or distributing items within a field of view.

As is shown in FIG. 2, the imaging device 260 includes one or more processors 262, one or more memory components 264, one or more transceivers 266 and one or more sensors 268. The processors 262 may be configured to process imaging data captured by the imaging device 260, such as by executing any number of detection or recognition algorithms, including but not limited to one or more artificial neural networks, e.g., convolutional neural networks. The memory components 264 may be configured to receive and store any type of information or data thereon, including but not limited to images of any type or form. The transceivers 266 may be configured to enable the imaging device 260 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, or any other technologies or protocols.

The sensors 268 may include color sensors (or grayscale sensors or black-and-white sensors) and/or depth sensors for capturing visual imaging data (e.g., textures) or depth imaging data regarding objects within the field of view of the imaging device 260. For example, the sensors 268 may capture one or more still or moving images (e.g., streams of visual and/or depth images or image frames), along with any relevant audio signals or other information (e.g., position data), which may be shared with one or more external computer devices via the transceiver 266 over the network 290, through the sending and receiving of digital data.

The imaging device 260 may include one or more other sensors, memory or storage components and processors to capture, analyze and/or store imaging data, and such sensors, memory components or processors may further include one or more photosensitive surfaces, filters, chips, electrodes, clocks, boards, timers or any other relevant features (not shown).

The imaging device 260 may also include manual or automatic features for modifying its field of view or orientation. For example, the imaging device 260 may be configured in a fixed position, or with a fixed focal length (e.g., fixed-focus lenses) or angular orientation. Alternatively, the imaging device 260 may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging device 260 or changes in one or more of the angles defining the angular orientation.

For example, the imaging device 260 may be hard-mounted to a support or mounting that maintains the device in a fixed configuration or angle with respect to one, two or three axes. Alternatively, however, the imaging device 260 may be provided with one or more motors and/or controllers for manually or automatically operating one or more of the components, or for reorienting the axis or direction of the device, i.e., by panning or tilting the device. Panning the imaging device 260 may cause a rotation within a horizontal axis or about a vertical axis (e.g., a yaw), while tilting an imaging device may cause a rotation within a vertical plane or about a horizontal axis (e.g., a pitch). Additionally, the imaging device 260 may be rolled, or rotated about its axis of rotation, and within a plane that is perpendicular to the axis of rotation and substantially parallel to a field of view of the imaging device 260.

The materials handling facility 270 may be any facility that is adapted to receive, store, process and/or distribute items from a variety of sources to a variety of destinations on behalf of any entity, including but not limited to an electronic marketplace. The materials handling facility 270 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 270. Upon their arrival at the materials handling facility 270, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts that may not be inherently organized into countable units, and may instead be managed in terms of measurable quantities such as units of length, area, volume, weight, time duration or other dimensional properties characterized by units of measurement.

In some implementations, the item distribution system 210 and the imaging device 260 may be provided in a common physical area or space of the materials handling facility 270, e.g., within any type of retail store or establishment, or outside of or adjacent to the physical area or space of the materials handling facility 270. Inventory items may be stored within the materials handling facility 270 on the strip 215, as well as on inventory shelves, storage units or another like systems, such as in bins, on shelves or via other suitable storage mechanisms.

As is shown in FIG. 2, the materials handling facility 270 includes a networked computer infrastructure for performing various computer-related functions associated with the receipt, storage, processing and distribution of such items, including one or more physical computer servers 272, data stores (e.g., databases) 274 and/or processors 276, that may be provided in the same physical location as the materials handling facility 270, or in one or more alternate or virtual locations, e.g., in a "cloud"-based environment. In some implementations, the servers 272, the data stores 274 and/or the processors 276 or any number of other computing devices or resources may further execute any type of computer-based function or compute any type or form of calculation, including but not limited to any formulas, equations, algorithms or techniques for determining one or more probabilities or performing any number of statistical tests.

The servers 272, the data stores 274 and/or the processors 276 may be configured to process imaging data received from the imaging device 260, and to detect or recognize any activated or deactivated ones of the indicators 235-1, 235-2 . . . 235-n depicted within the imaging data. The servers 272, the data stores 274 and/or the processors 276 may be further configured to determine a number of inventory items placed on or held by the strip 215 based on the activated or deactivated ones of the indicators 235-1, 235-2 . . . 235-n depicted within imaging data, and to update any records accordingly. In some implementations, the servers 272, the data stores 274 and/or the processors 276 may be configured to execute one or more machine learning systems or techniques. For example, in some implementations, the servers 272 may be configured to execute an artificial neural network, such a convolutional neural network, to process imaging data received from the imaging device 260 over the network 290.

Alternatively, in some implementations, any of the processing tasks or functions described herein as being performed by one or more of the servers 272, the data stores 274 and/or the processors 276 may also be performed by one or more processors or processor units provided aboard the imaging device 260, e.g., the processor 262. For example, in some implementations, the imaging device 260 may capture one or more images of the strip 215, determine numbers or patterns of activated or deactivated ones of the indicators 235-1, 235-2 . . . 235-n depicted within the images, and generate or update one or more sets of information or data regarding numbers of items provided on the strip 215 accordingly. The imaging device 260 may then transmit such information or data to the servers 272, the data stores 274 and/or the processors 276 over the network 290, e.g., via a wired connection, wirelessly, or in any other manner, and may further generate or update one or more records regarding numbers of items provided on the strip 215 or elsewhere accordingly.

The materials handling facility 270 may include one or more inventory areas having predefined two-dimensional or three-dimensional storage units for accommodating items and/or containers of such items, such as aisles, rows, bays, shelves, slots, bins, racks, tiers, bars, hooks, cubbies or other like storage means, or any other appropriate regions or stations, which may be flat or angled, stationary or mobile, and of any shape or size. Additionally, as is discussed above, the materials handling facility 270 may further include one or more receiving stations featuring any apparatuses that may be required in order to receive shipments of items at the materials handling facility 270 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The materials handling facility 270 may further include one or more distribution stations where items that have been retrieved from a designated inventory area may be evaluated, prepared and packed for delivery from the materials handling facility 270 to addresses, locations or destinations specified by customers, also by way of carriers such as cars, trucks, trailers, freight cars, container ships or cargo aircraft (e.g., manned aircraft or unmanned aircraft, such as drones).

The materials handling facility 270 may operate one or more order processing and/or communication systems using computer devices or resources in communication with one or more of the servers 272, the data stores 274 and/or the processors 276, or through one or more other computing devices or resources that may be connected to the network 290, in order to transmit or receive information in the form of digital or analog data, or for any other purpose.

Although the system 200 of FIG. 2 includes a single box corresponding to an item distribution system 210, a single box corresponding to a strip 215, and three boxes corresponding to switches 220-1, 220-2 . . . 220-n, along with a single box corresponding to a display unit 230 and three boxes corresponding to indicators 235-1, 235-2 . . . 235-n, as well as a single box corresponding to an imaging device 260, those of ordinary skill in the pertinent arts will recognize that any number or type of imaging devices, strips or display units may be provided in association with the materials handling facility 270 in accordance with the present disclosure, and that such strips and display units may have any number of switches or indicators, respectively. For example, in some implementations, the materials handling facility 270 may be associated with dozens or even hundreds of strips and display units.

The materials handling facility 270 may also include any number of other sensors, components or other features for controlling or aiding in the operation of the materials handling facility 270, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), laser sensors, weight sensors, attitude sensors, depth gauges, accelerometers, or sound sensors (e.g., microphones, piezoelectric sensors, vibration sensors or other transducers for detecting and recording acoustic energy from one or more directions).

The materials handling facility 270 may also include one or more human operators (not shown), such as one or more workers, who may be any designated personnel tasked with performing one or more tasks within the materials handling facility 270 in general, or within one or more inventory areas, receiving stations, distribution stations or other locations of the materials handling facility 270 in particular. Such workers may handle or transport items (e.g., any type or form of good, product, media or other tangible consumer article) within the materials handling facility 270, or operate one or more pieces of equipment therein (not shown). Such workers may also operate one or more specific computing devices or resources for registering the receipt, retrieval, transportation or storage of items within the materials handling facility 270, e.g., a general purpose device such as a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link or any other aspect of the present disclosure.

The data and/or computer-executable instructions, programs, firmware, software and the like (also referred to herein as "computer-executable" components) described herein may be stored on a transitory and/or non-transitory computer-readable medium that is within or accessible by computers or computer components such as the imaging device 260 or the server 272, or any other computers or control systems utilized by or in association with the materials handling facility 270, and having sequences of instructions which, when executed by a processor (e.g., a central processing unit, or "CPU," or a graphics processing unit, or "GPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As is discussed above, some implementations of the present disclosure may be used to determine inventory levels on strips (e.g., impulse strips) by capturing images of arrangements or configurations of indicators that are each associated with clips, hooks or other features that are associated with such strips, and configured to be activated or deactivated depending on whether the clips, the hooks or the other features are loaded with an item. Where a pattern of activated or deactivated indicators associated with a strip may be detected within imaging data, a level of inventory on the strip may be determined accordingly.

Figure 3:
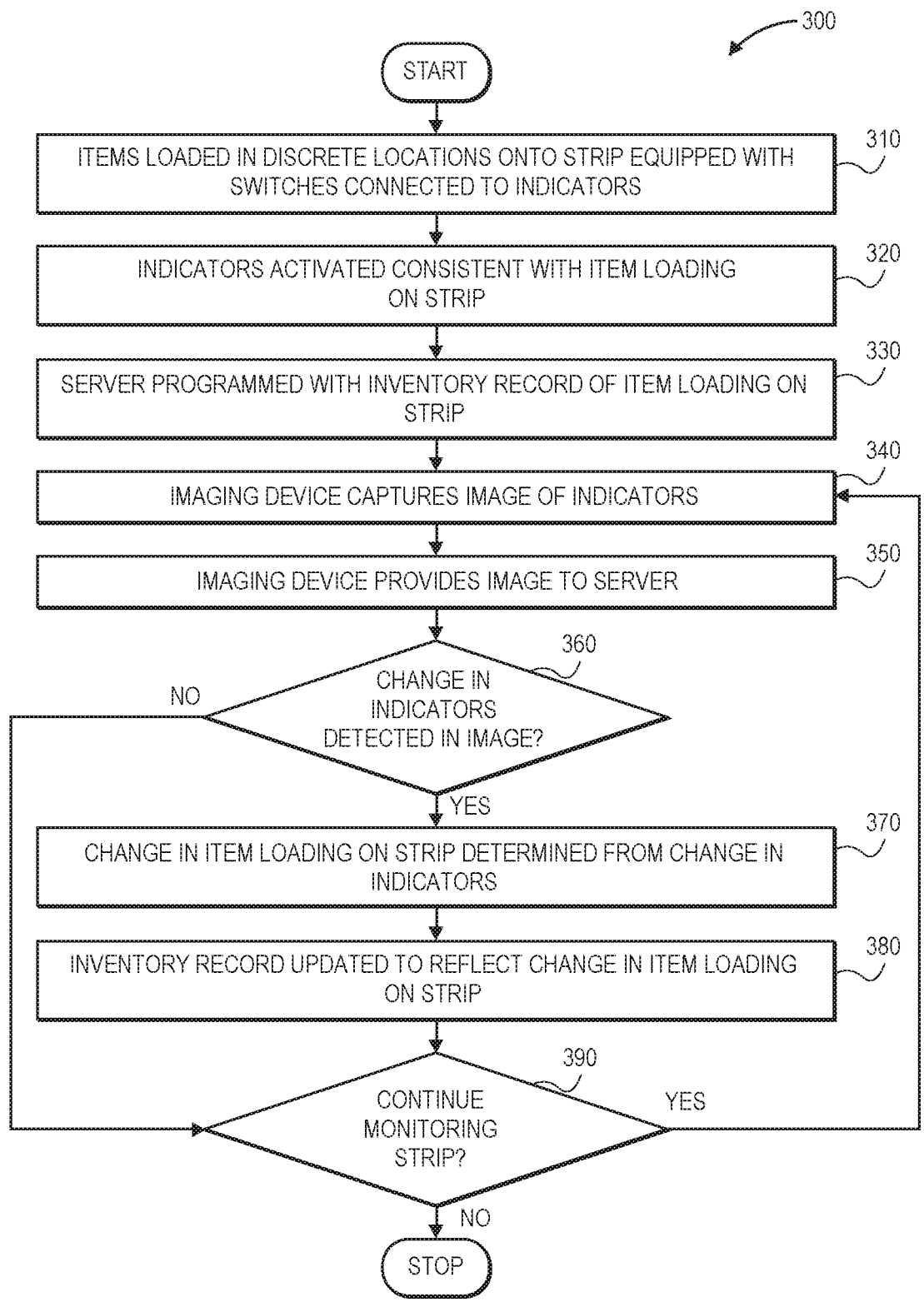
FIG. 3 is a flow chart of one process for determining inventory levels in accordance with implementations of the present disclosure.

Referring to FIG. 3, a flow chart 300 of one process for determining inventory levels in accordance with implementations of the present disclosure is shown. At box 310, one or more items are loaded in discrete locations onto a strip that is equipped with switches that are connected to indicators in an arrangement or configuration (e.g., an array). For example, each of the discrete locations on the strip may be configured to receive one or more items, e.g., by one or more clips, hooks or other features, such as where an item or container or packaging for the item includes a hole, a receptacle, or another corresponding feature that may be secured within a clip, placed on a hook or otherwise coupled to another feature of the strip. Each of the clips, hooks or other features may include a switch or other component that is electrically coupled to an indicator, such that the indicator is activated (or deactivated) when an item is loaded onto the strip at one of the discrete locations, and the indicator is deactivated (or activated) when the item is removed from the strip at the one of the discrete locations. In some implementations, the arrangement or configuration may take the form of an array having a known number of indicators arranged in rows and columns. Alternatively, in other implementations, the indicators may be arranged in any other manner, e.g., in a line, in a circle, or in any other shape or configuration.

In some implementations, the strip may be mounted or installed in a materials handling facility or elsewhere in an independent manner, e.g., by or to a free-standing system. In some other implementations, however, the strip may be mounted in association with another storage unit at the materials handling facility. In such implementations, the items loaded onto the strip in the discrete locations may be related to the items stored on the other storage unit, e.g., complements to such items. Alternatively, however, the items loaded onto the strip in the discrete locations need not bear any relationship or affiliation with the items stored on the other storage unit.

At box 320, the indicators are activated based in a manner consistent with the item loading on the strip. For example, in some implementations, each of the indicators corresponding to the discrete locations on the strip that were loaded with items at box 310 may be activated, and indicators corresponding to any other discrete locations on the strip that were not loaded with items may remain deactivated. Alternatively, in some other implementations, each of the indicators corresponding to the discrete locations on the strip that were loaded with items at box 310 may be deactivated, and indicators corresponding to any other discrete locations on the strip that were not loaded with items may remain deactivated.

At box 330, a server is programmed with an inventory record of the item loading onto the strip at box 310. In some implementations, the server (or other computer device) may be manually or automatically programmed with numbers and types of items that are loaded at the discrete locations onto the strip, e.g., manually by one or more human users, or automatically by receipt of information or data from one or more other computer devices. In some implementations, where the items loaded onto the strip are homogenous, fungible or identical in nature, the data record may simply indicate a number of the items loaded onto the strip. Alternatively, in some implementations, where the items are independent or unique, or are neither homogenous, fungible nor identical, the data record may indicate not only a number of such items loaded onto the strip but also identifiers of the respective items and the discrete locations on the strip where each of such items is loaded.

At box 340, an imaging device captures an image of the indicators activated in the arrangement or configuration, either as a single image or as one of a stream of images. In some implementations, the imaging device may include the strip and any other aspects of a materials handling facility within a field of view, e.g., one or more storage units, floor surfaces or other portions or locations of the materials handling facility. The imaging device may be a digital camera or other imaging device that is utilized to capture imaging data for any purpose, including but not limited to event detection, customer location, or the like, as well as for capturing imaging data from the indicators of the arrangement or configuration. Alternatively, in some other implementations, the imaging device may be provided in a dedicated manner, e.g., for the exclusive purpose of capturing imaging data from the indicators of the arrangement or configuration.

At box 350, the imaging device provides the image to the server, e.g., over one or more networks. For example, the imaging device may transmit the image over a wired or wireless connection to the server or other computer device that was programmed with the record of the items loaded onto the strip, e.g., in real time or in near-real time, or at any other time.

At box 360, whether a change in the indicators is detected in the image is determined. For example, the server or other computer device may determine whether the indicators that are depicted within the image as being activated or deactivated differs from the data record of the items loaded onto the strip, or, alternatively, from an image that was captured of the indicators following the initial loading of the items at box 310, or following a most recent change in the loading. A change in the indicators may be determined where any number of the indicators are depicted as being activated in the image captured at box 340, but were previously not activated, or vice versa (e.g., where the indicators are depicted as being deactivated in the image but were previously activated). In some implementations, the server may be configured to evaluate specific portions of the image that are known to include the indicators in the arrangement or configuration. In some implementations, where the indicators include one or more illuminators that are configured to emit light, the server may also be programmed with wavelengths (or colors or frequencies) associated with each of such indicators, and may be configured to process the image and determine whether any of such wavelengths are present or absent therein. For example, the server may detect a pattern of activated indicators within the image, and compare the pattern of the activated indicators to a pattern corresponding to the data record indicating the item loading on the strip, or a pattern of activated indicators determined following the initial loading of the strip at box 310 or a most recent change in the loading. Alternatively, where the indicators have discrete markings, colors or other visible features, the server may be programmed with information regarding such markings, colors or features, and configured to process the image and determine whether any of such wavelengths are present or absent therein. Any other manner for determining whether an image depicts activated or deactivated indicators, in any number or in any location within the image, may be utilized in accordance with the present disclosure.

If a change in the indicators is detected within the image at box 360, the process advances to box 370, where a change in the item loading is determined from the change in indicators depicted within the image. For example, where each of the indicators in the arrangement or configuration corresponds to a unique location on the strip, a change in the item loading on the strip may be determined from the change in the indicator arrangement or configuration. An item may be presumed to have been removed from one of the discrete locations on the strip where an indicator corresponding to that location was previously activated, corresponding to a loaded condition at that discrete location, and is depicted as being deactivated in the image captured at box 340 (or vice versa, e.g., where the indicator was previously deactivated and is now activated). Alternatively, those of ordinary skill in the pertinent arts will also recognize that an item may be presumed to have been added to one of the discrete locations on the strip where an indicator corresponding to that location was previously deactivated, corresponding to an unloaded condition at that discrete location, and is depicted as being activated in the image captured at box 340 (or vice versa, e.g., where the indicator was previously activated and is now deactivated).

Additionally, in some implementations, an image of the arrangement or configuration of the indicators may be captured by the imaging device following the initial loading of items at box 310, and the image may be processed to generate the record of the items loaded on the strip at box 330.

At box 380, the data record is updated to reflect the change in item loading on the strip determined at box 370. For example, where an item was removed from the strip, the data record may be adjusted to decrease a number of items on the strip, or to identify the specific item that was removed from the strip, based on the image captured at box 340. Alternatively, where an item is added to the strip, the data record may be adjusted to increase the number of items on the strip, or to identify the specific item that was added to the strip.

At box 390, after the data record has been updated to reflect the change in loading at box 380, or after no change in the indicators is detected at box 360, whether the continued monitoring of the item loading on the strip is desired may be determined. If the continued monitoring of the item loading on the strip is desired, then the process returns to box 340, where the imaging device captures another image of the indicators in the arrangement or configuration, and to box 350, where the imaging device provides the image to the server, e.g., for comparison to the data record or to a previously captured image. If the continued monitoring of the item loading on the strip is no longer desired, however, then the process ends.

Referring to FIGS. 4A through 4D, views of aspects of one system for determining inventory levels in accordance with implementations of the present disclosure are shown. Except where otherwise noted, reference numerals preceded by the number "4" shown in FIGS. 4A through 4D indicate components or features that are similar to components or features having reference numerals preceded by the number "2" shown in FIG. 2, or by the number "1" shown in FIGS. 1A through 1H.

Figure 4A:
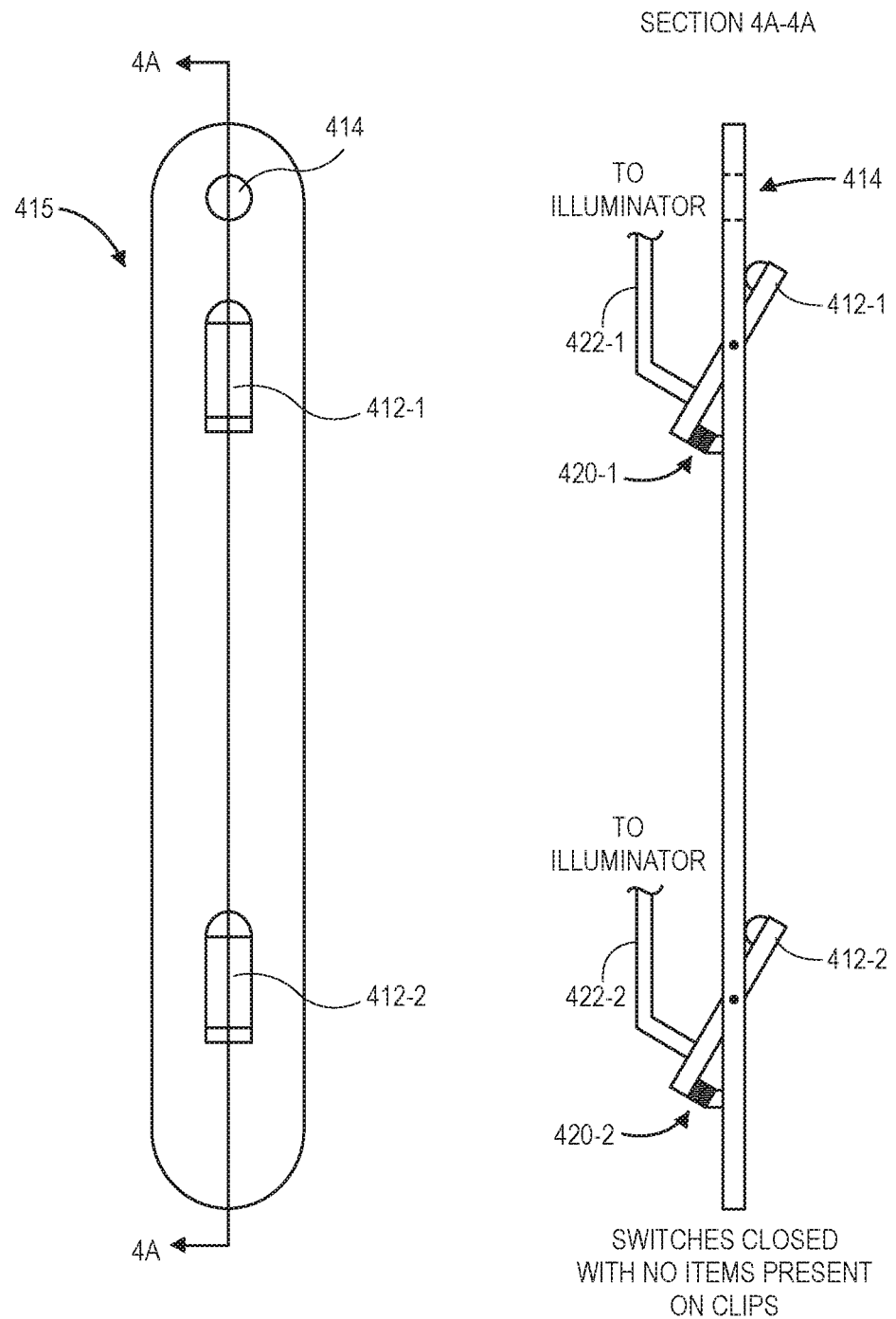
FIGS. 4A through 4D are views of aspects of one system for determining inventory levels in accordance with implementations of the present disclosure.

As is shown in FIG. 4A, a strip 415 (e.g., an impulse strip, or a merchandising strip) includes a pair of clips 412-1, 412-2 (or hooks or other features) for coupling one or more items to the strip 415, and a mounting hole 414 (or bore). The strip 415 may be mounted to one or more systems or structures by the bore 414, e.g., by inserting a nail, a screw, a hook, or another extension through the bore 414, and permitting the strip 415 to hang therefrom, or otherwise installed in any other manner. As is shown in the section view of FIG. 4A, each of the clips 412-1, 412-2 extends through a body of the strip 415 and is configured to rotate or pivot within a slot or other opening in the body of the strip 415, e.g., about a hinge, an axle or another feature. For example, each of the clips 412-1, 412-2 has an upper portion that contacts a front face of the body of the strip 415 and a lower portion that forms a switch 420-1, 420-2 on a rear face of the body of the strip 415. The shape and construction of the clips 412-1, 412-2 enables one or more items to be inserted between the upper portions of each of the clips 412-1, 412-2 and the body of the strip 415, and permitted to be suspended therefrom. The strip 415 may be formed from any suitable material. In some implementations, the clips 412-1, 412-2, may be spring-loaded or otherwise biased into the positions shown in FIG. 4A, with the upper portions of the clips 412-1, 412-2 in contact with the front face of the strip 415, and with the switches 420-1, 420-2 closed.

Figure 4B:
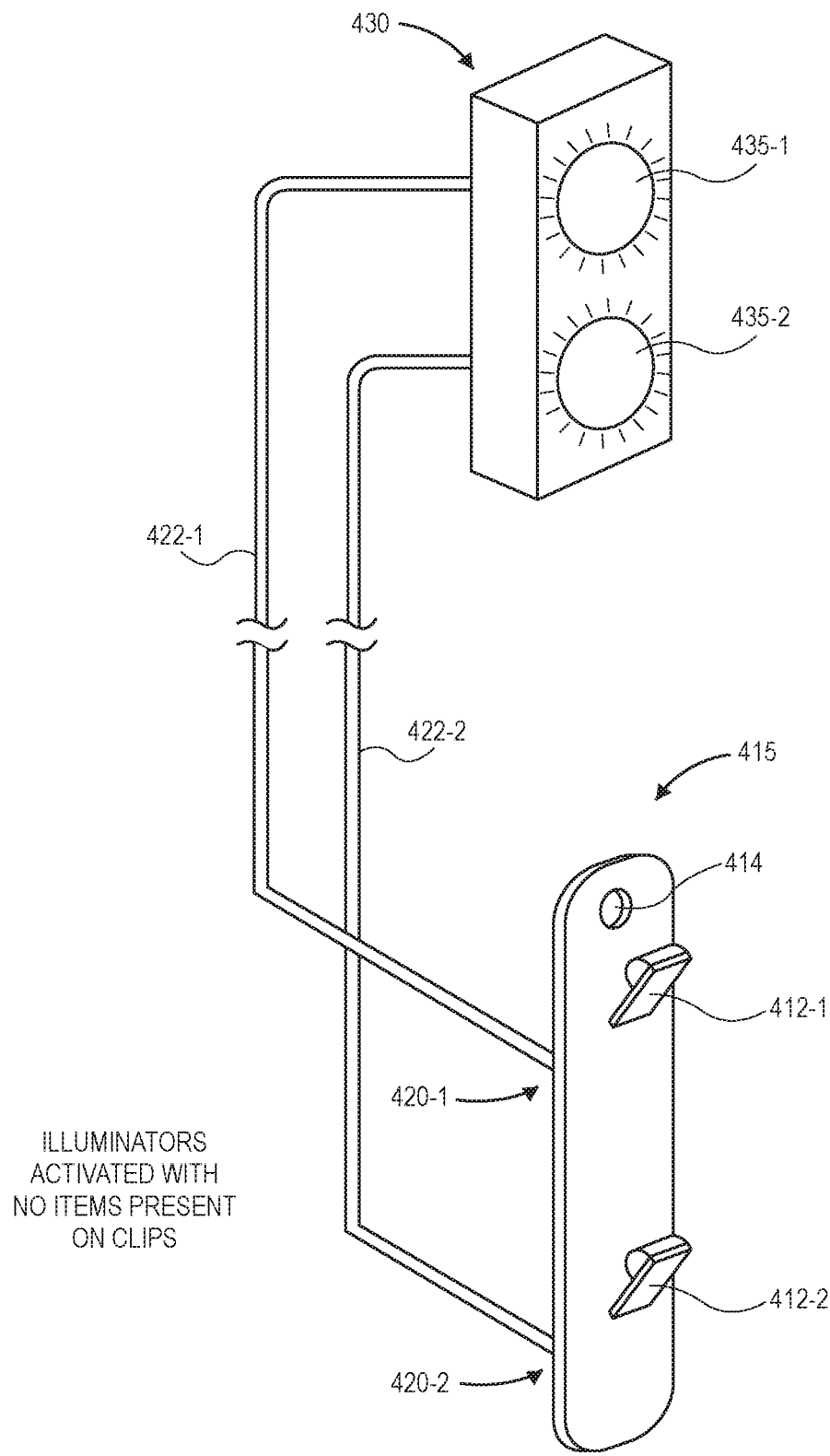

Furthermore, in some implementations, the clips 412-1, 412-2 and/or the strip 415 may be formed from any suitable materials, e.g., non-conductive materials, such as plastics, in order to reduce a risk of shorting a circuit when an item having a conductive surface is placed between the clips 412-1, 412-2 and the front face of the strip 415. For example, as is shown in FIG. 4B, the clips 412-1, 412-2 may feature plastic, rubber or other non-conductive coverings or components at distal ends of the upper portions of the clips 412-1, 412-2 that are configured to come into contact with the front face of the strip 415. Alternatively, the clips 412-1, 412-2 (or any hooks or other features) may have any other shapes, constructions or features, and may be joined to the strip 415 in any other manner. For example, in some implementations, each of the clips 412-1, 412-2 may be formed integral to the strip 415.

The switches 420-1, 420-2 include conductive features that are configured to close into contact with one another when the upper portions of the clips 412-1, 412-2 are in contact with the front face of the body of the strip 415, e.g., when no items are present on the clips 412-1, 412-2, and to open from one another when the upper portions of the clips 412-1, 412-2 are not in contact with the front face of the body of the strip 415, e.g., when one or more items are present on the clips 412-1, 412-2. Alternatively, the switches 420-1, 420-2 may operate in any other manner. For example, the switches 420-1, 420-2 may be provided in association with the hinge, the axle or the other feature by which the clips 412-1, 412-2 are mounted within the strip 415, and may be activated or deactivated accordingly, e.g., when one or more items is present on one of the clips 412-1, 412-2. Additionally, a pair of conductors 422-1, 422-2 extend from a rear face of the body of the strip 415.

As is shown in FIG. 4B, the conductors 422-1, 422-2 extend between the rear face of the body of the strip 415 and a display unit (or housing, frame, or other structure or component) 430 including a pair of illuminators 435-1, 435-2 (or other indicators). Thus, each of the conductors 422-1, 422-2 extends from one of the switches 420-1, 420-2 to a corresponding one of the illuminators 435-1, 435-2. The housing 430 may further include one or more circuit components, power sources (e.g., batteries) or other systems and may be mounted at any height (e.g., one foot, two feet, three feet, six feet, or ten feet, or any other height) above the strip 415. Thus, as is shown in FIG. 4B, each of the illuminators 435-1, 435-2 is activated when no items are present on the clips 412-1, 412-2, and when the switches 420-1, 420-2 are closed. Alternatively, in some implementations, the illuminators 435-1, 435-2 may be deactivated when no items are present on the clips 412-1, 412-2.

In accordance with implementations of the present disclosure, an inventory level of the strip 415 may be determined by capturing an image of the housing 430 and the illuminators 435-1, 435-2 by an imaging device (not shown in FIG. 4B), and determining a number of the illuminators 435-1, 435-2 that are activated, or a number of the illuminators 435-1, 435-2 that are not activated. Such an image of the housing 430 may be processed by a server or another computer device that is programmed to associate numbers or patterns of activated or deactivated illuminators with inventory levels on the strip 415. With the illuminators 435-1, 435-2 activated as shown in FIG. 4B, a number or a pattern of the activated illuminators (viz., the illuminators 435-1, 435-2) or the deactivated illuminators (none) may be determined and associated with an inventory level on the strip 415, namely, that the strip 415 does not have any items loaded thereon.

Figure 4C:
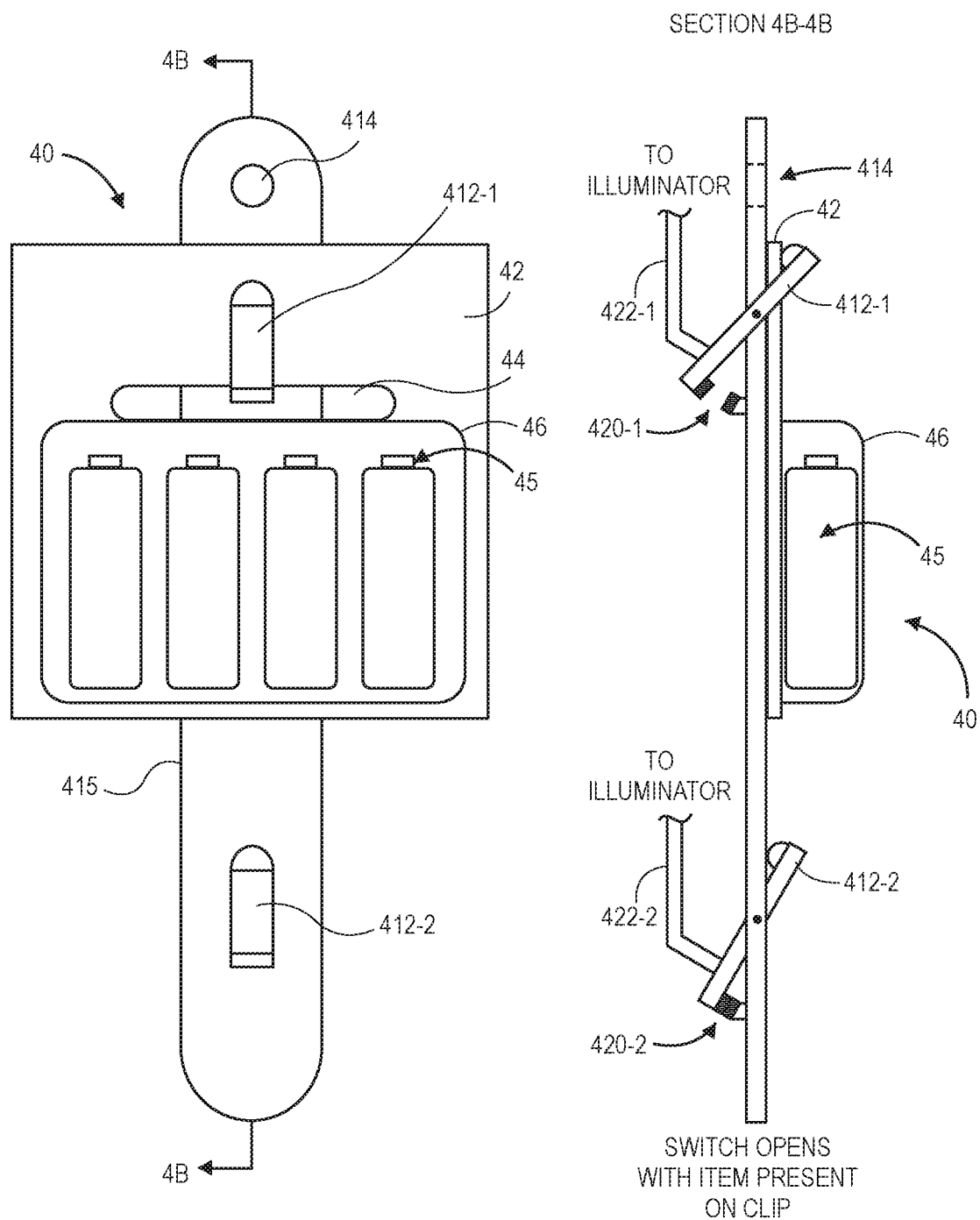

As is shown in FIG. 4C, an item 40 (e.g., a package of batteries) is placed on the clip 412-1. The item 40 includes a backing 42 having an opening 44 (e.g., a hole) extending therethrough and a plurality of products 45 (e.g., batteries) placed between the backing 42 and a cover 46. The item 40 may be placed on the clip 412-1 in any manner, such as by drawing an upper portion of the clip 412-1 away from the body of the strip 415, and extending the upper portion of the clip 412-1 through the opening 44 in the backing 42 of the item 40. The item 40 may descend via gravity until the hinge, the axle or the other feature by which the clip 412-1 is mounted within the strip 415 comes into contact with an upper edge of the opening 44, with a balance of the backing 42, the products 45 and the cover 46 hanging below. As is also shown in FIG. 4C, the placement of the item 40 on the clip 412-1 causes the switch 420-1 to open, and deactivates the illuminator 435-1 associated with the clip 412-1.

Figure 4D:
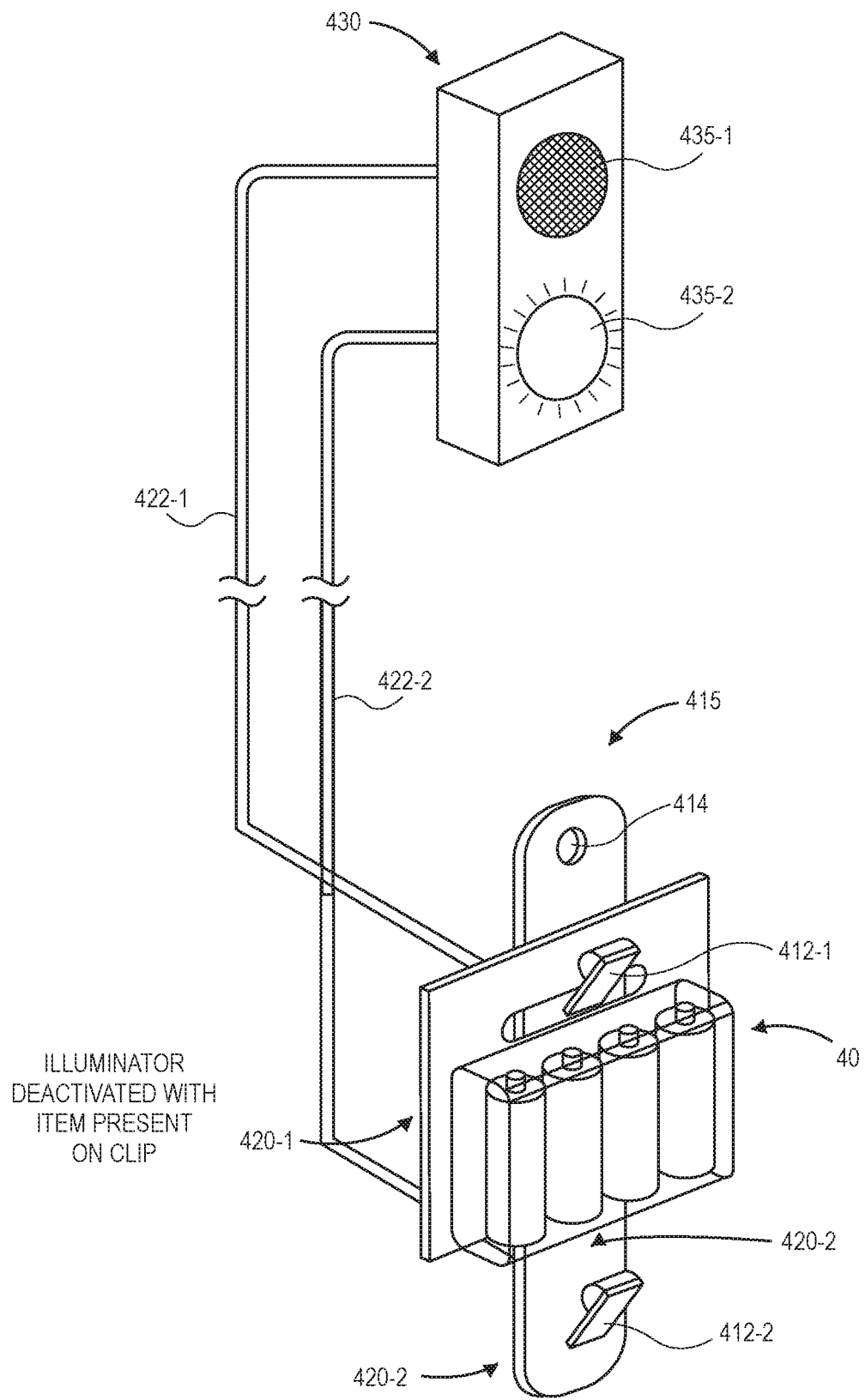

As is shown in FIG. 4D, with the item 40 placed on the clip 412-1, and the switch 420-1 open, an inventory level of the strip 415 may be determined by capturing an image of the housing 430 and the illuminators 435-1, 435-2, and determining a number of the illuminators 435-1, 435-2 that are activated, or a number of the illuminators 435-1, 435-2 that are not activated. With the illuminator 435-1 deactivated, and the illuminator 435-2 activated, as shown in FIG. 4B, the pattern of the activated illuminators (viz., the illuminator 435-2) or the deactivated illuminators (viz., the illuminator 435-1) may be determined and associated with an inventory level on the strip 415.

In some implementations, an image of the housing 430 and the illuminators 435-1, 435-2 may be processed to determine that the strip 415 includes a single item somewhere thereon. Such implementations may be preferred where the items are homogenous, fungible or identical in nature, or where determining an identity of the items loaded thereon, or the specific positions of such items, is not essential. In some implementations, an image of the housing 430 and the illuminators 435-1, 435-2 may be processed to determine that the strip 415 includes a single item on the clip 412-1, and that the clip 412-2 does not include any items thereon. Such implementations may be preferred where knowing the specific status of each of the clips 412-1, 412-2 is desired. In some implementations, an image of the housing 430 and the illuminators 435-1, 435-2 may be processed to determine that the strip 415 includes the specific item 40 on the clip 412-1, and that the clip 412-2 does not include any items thereon, such as where a server or other computer device is programmed to associate each of the illuminators 435-1, 435-2 with a specific type or kind of item. Such implementations may be preferred where knowing the exact inventory levels of specific items, e.g., the item 40, is desired.

Information or data that may be determined regarding an inventory level of a strip (e.g., an impulse strip, or a merchandising strip), such as the strip 415 of FIGS. 4A through 4D, may be utilized for any purpose.

Figure 5A:
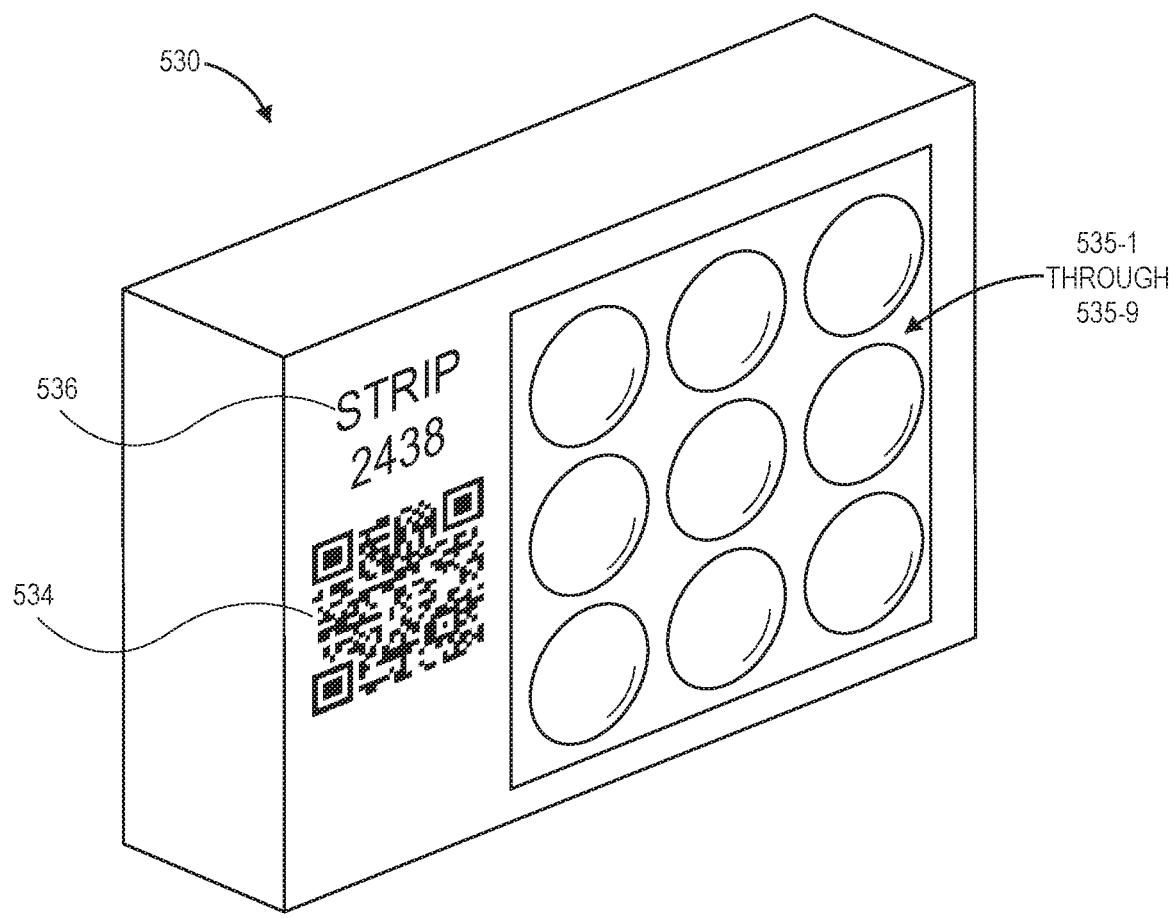
FIGS. 5A through 5C are views of aspects of one system for determining inventory levels in accordance with implementations of the present disclosure.
Figure 5B:
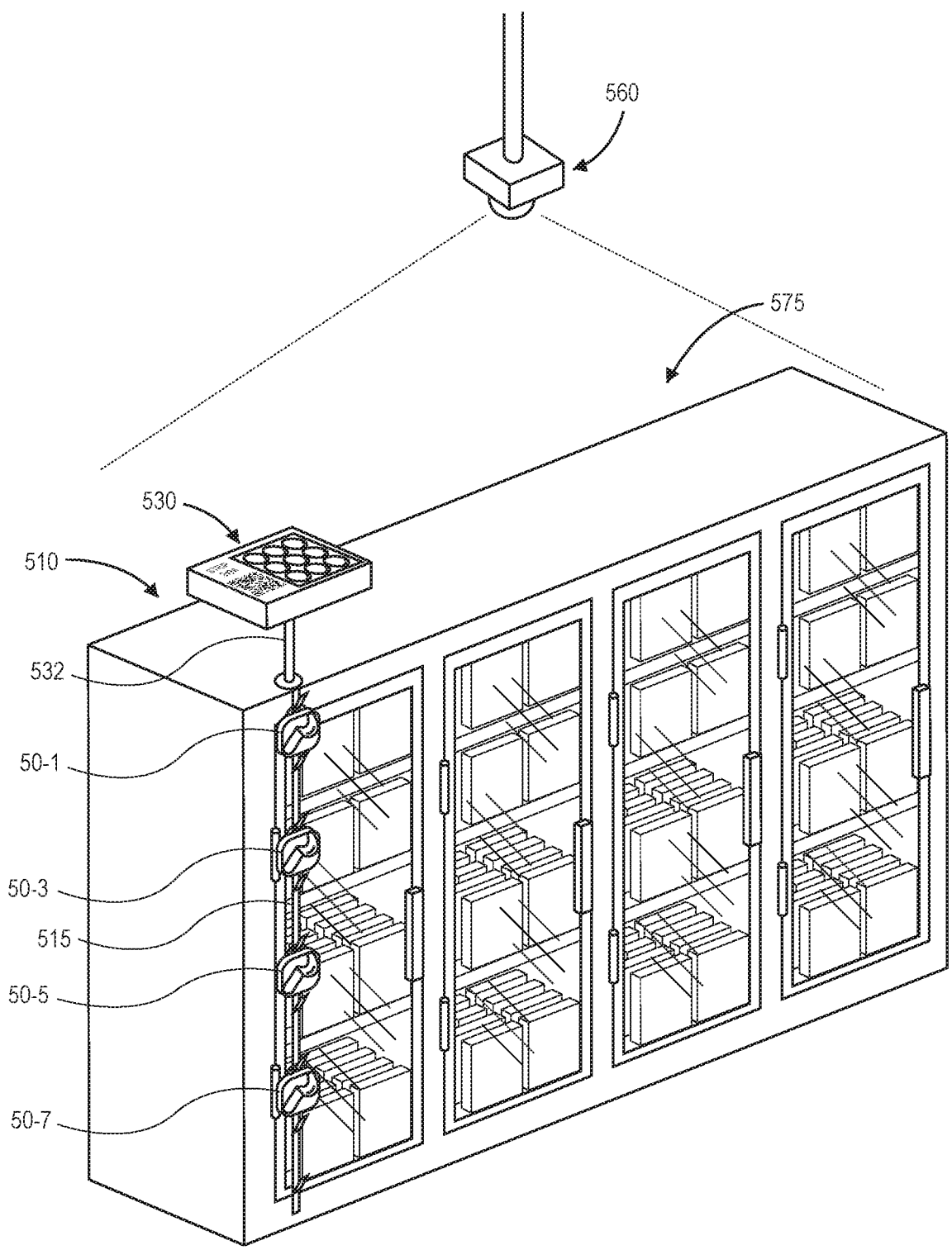
Figure 5C:
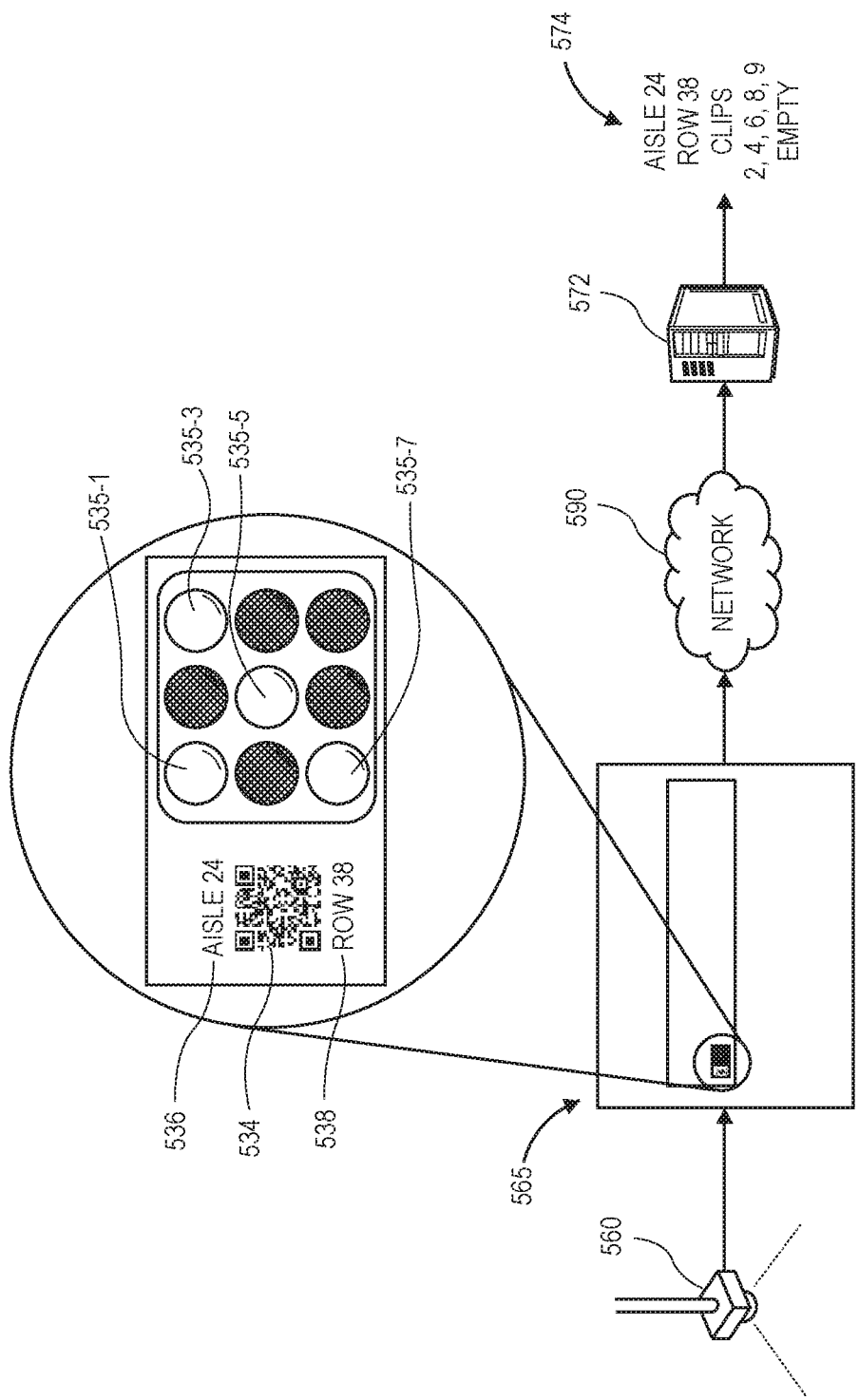

A set of indicators may also include one or more visible identifiers that may appear within images captured of the set of indicators, and may be further used to determine information or data regarding inventory levels in a materials handling facility generally, or inventory levels of a strip (e.g., an impulse strip, or a merchandising strip) in particular. Referring to FIGS. 5A through 5C, views of aspects of one system for determining inventory levels in accordance with implementations of the present disclosure is shown. Except where otherwise noted, reference numerals preceded by the number "5" shown in FIGS. 5A through 5C indicate components or features that are similar to components or features having reference numerals preceded by the number "4" shown in FIGS. 4A through 4D, by the number "2" shown in FIG. 2, or by the number "1" shown in FIGS. 1A through 1H.

As is shown in FIG. 5A, a display unit (or housing, frame, or other structure or component) 530 includes a plurality of indicators 535-1 through 535-9 that are provided in an arrangement or configuration (or array). The indicators 535-1 through 535-9 are provided in three rows and three columns, and are visible within or through a front face of the display unit 530. The display unit 530 of FIG. 5A may be provided in any position or orientation with respect to a switch-equipped strip configured to receive any number of items thereon, e.g., by one or more clips, hooks or other features.

Additionally, as is also shown in FIG. 5A, the front face of the display unit 530 further includes a bar code 534 and a set 536 of alphanumeric characters. The bar code 534 may be a one-dimensional or two-dimensional (e.g., "QR") code that is encoded to embody or represent supplemental information or content, or a link to one or more resources having supplemental information or content stored thereon. For example, the bar code 534 may be a link to one or more web-based or other electronic resources regarding the display unit 530 or one or more switch-equipped strips associated with the display unit 530, or any number of items that are configured or designated for storage on such strips. Additionally, the set 536 of alphanumeric characters may also reference or embody supplemental information or content regarding the display unit 530, any switch-equipped strips associated with the display unit 530, or any items that are configured or designated for storage on such strips.

Because the display unit 530 includes nine indicators 535-1 through 535-9, the display unit 530 may preferably be associated with a switch-equipped strip having up to nine clips, hooks or other features for receiving items thereon, and each of such clips, hooks or other features may be equipped with a switch that is electrically coupled to one of the indicators 535-1 through 535-9. Additionally, the display unit 530 may be provided at any location with respect to such a strip, and within a field of view of one or more imaging devices. In some implementations, the display unit 530 may be mounted at any height or elevation above a structure (e.g., a storage unit, such as a shelving unit) to which one or more switch-equipped strips are mounted or otherwise installed.

As is shown in FIG. 5B, the display unit 530 may be mounted within a materials handling facility 570, e.g., to a storage unit 575 (viz., a sliding door refrigerated cooler) by a support (or stanchion) 532, at a predetermined height above the storage unit 575.

A switch-equipped strip 515 may be connected to or mounted within a vicinity of the display unit 530. For example, as is shown in FIG. 5B, the strip 515 descends in front of a front face of the storage unit 575, and includes a plurality of items 50-1, 50-3, 50-5, 50-7 in discrete locations on the strip 515. Additionally, as is also shown in FIG. 5B, the strip 515, the display unit 530 and the storage unit 575 are within a field of view of an imaging device 560, which may be provided for any purpose, including but not limited to detecting events, locating customers, or monitoring conditions of spaces within a vicinity of the storage unit 575 for spills, hazards or other undesired solids, liquids or other substances. The display unit 530 is aligned in a horizontal manner, e.g., in or parallel to a substantially horizontal plane, and with the indicators 535-1 through 535-9 facing vertically upward, such that the indicators 535-1 through 535-9 are visible within a field of view of the imaging device 560, but are not visible to customers of the materials handling facility 570 who interact with the strip 515 or the storage unit 575. Alternatively, the display unit 530 may be aligned in any manner, and at any plane, such that the indicators 535-1 through 535-9 remain visible within fields of view of one or more imaging devices, e.g., the imaging device 560.

Moreover, with the display unit 530 mounted above the storage unit 575 in the manner shown in FIG. 5B, or in any other manner, the display unit 530 may be connected to one or more power sources or communication networks (not shown in FIG. 5B) by way of wired connections extending along and above the storage unit 575. Such connections may be substantially permanent or temporary in nature, and may be provided for use by the display unit 530 or any other components, including the storage unit 575 or any other components (not shown). Furthermore, the display unit 530 may further receive power from one or more power sources, e.g., banks or arrays of solar panels or cells, or any other power sources, that may be provided atop or above the storage unit 575.

As is shown in FIG. 5C, the imaging device 560 may capture an image 565 of the strip 515, the display unit 530 and the storage unit 575, and transmit the image to a server 572 associated with the materials handling facility 570. The server 572 may process the image 565 to detect and recognize one or more of the bar code 534 or set 536 of alphanumeric characters depicted within the image 565, and to identify the display unit 530 based on the supplemental information or content encoded within or identified by the bar code 534 or the set 536 of alphanumeric characters.

Additionally, the server 572 may process the image 565 to detect and recognize one or more of the indicators 535-1, 535-3, 535-5, 535-7 that are activated, or a pattern of the indicators 535-1, 535-3, 535-5, 535-7, and determine a status of the loading of items on the strip 515 based on the indicators 535-1, 535-3, 535-5, 535-7 or the pattern. A data record 574 may be updated with information regarding not only the level of inventory on the strip 515 but also a location (e.g., the storage unit 575) of the strip 515 and the items 50-1, 50-3, 50-5, 50-7 within the materials handling facility 570. In some implementations, such as is shown in FIG. 5C, the data record 574 may be updated based on the specific statuses of one or more clips (or hooks or other features) on the strip 515, which may be determined based on the indicators 535-1, 535-3, 535-5, 535-7 that are activated, or the pattern of the indicators 535-1, 535-3, 535-5, 535-7.

Alternatively, in some implementations, the server 572 may process the image 565 to detect and recognize a number or a pattern of the indicators 535-2, 535-4, 535-6, 535-8, 535-9 that are not activated, and determine a status of the loading of items on the strip 515 based on the numbers or the patterns of the indicators 535-2, 535-4, 535-6, 535-8, 535-9.

The supplemental information or content within or identified by the bar code 534 or the set 536 of alphanumeric characters enable the strip 515 and the display unit 530 to be installed in any location within the materials handling facility 570, and the strip 515 need not be associated with the storage unit 575 or any other feature of the materials handling facility 570. For example, when the display unit 530 is recognized within the image 565, the bar code 534 or the set 536 of alphanumeric characters may be detected and interpreted to identify the display unit 530 or the strip 515 associated with the display unit 530 at a location within the materials handling facility 570, and to determine an inventory of items available at the location based on the indicators 535-1, 535-3, 535-5, 535-7 that are activated, or a pattern of the indicators 535-1, 535-3, 535-5, 535-7.

Although some of the implementations disclosed herein reference the determination of inventory levels provided on strips that are equipped with switches that, when opened or closed, may activate or deactivate illuminators provided in an arrangement or configuration, e.g., in a commercial setting, the systems and methods of the present disclosure are not so limited. For example, the systems and methods disclosed herein may be used to determine numbers of items in any type of commercial or non-commercial settings, and may utilize indicators that may but need not operate by the emission of light therefrom.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Additionally, it should also be appreciated that the detailed description is set forth with reference to the accompanying figures. In the figures, the use of the same reference numbers in different figures indicates similar or identical items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Moreover, with respect to the one or more methods or processes of the present disclosure shown or described herein, including but not limited to the flow chart shown in FIG. 3, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately,"

"generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:
a display unit comprising a plurality of illuminators, wherein the plurality of illuminators is arranged in an array;
a storage unit;
a merchandising strip having a first end, a second end, a plurality of clips and a plurality of switches, wherein the first end is mounted to the storage unit, wherein each clip of the plurality of clips is coupled to the strip between the first end and the second end, wherein each switch of the plurality of switches is associated with one of the plurality of clips, wherein each switch of the plurality of switches is configured to activate one of the plurality of illuminators when an item for sale is held by the associated clip of the plurality of clips, and wherein each switch of the plurality of switches is configured to deactivate the one of the plurality of illuminators when an item for sale is not within one of the clips;
a digital camera having a field of view, wherein at least the display unit is within the field of view; and
a server in communication with the digital camera, wherein the server is programmed with one or more sets of instructions that, when executed, cause the server to execute a method comprising:
receiving a first image from the digital camera;
detecting at least a first number of the plurality of illuminators depicted within the first image, wherein each of first number of the plurality of illuminators is depicted as activated within the first image; and
determining that at least a first plurality of items is stored on the merchandising strip based at least in part on the first number of the plurality of illuminators.

2. The system of claim 1, wherein the method further comprises:
receiving a second image from the digital camera;
detecting at least a second number of the plurality of illuminators depicted within the second image, wherein each of the second number of the plurality of illuminators is depicted as activated within the second image;
determining that at least a second plurality of items is stored on the merchandising strip based at least in part on the second number of the plurality of illuminators, wherein at least one of the first plurality of items is not included in the second plurality of items; and
storing an indication that the at least one of the first plurality of items has been removed from the merchandising strip by at least one customer.

3. A method comprising:
capturing a first image by an imaging device at a first time, wherein a plurality of indicators is within a field of view of the imaging device at the first time,
wherein each indicator of the plurality of indicators is electrically coupled to one of a plurality of switches,
wherein each switch of the plurality of switches is associated with one of a plurality of locations on a strip, and
wherein each switch of the plurality of switches is configured to complete a circuit that activates one of the plurality of indicators when an item is provided at a corresponding location of the plurality of locations on the strip;
detecting at least a first number of the plurality of indicators depicted within the first image, wherein each indicator of the first number of the plurality of indicators is depicted as activated within the first image; and
determining at least a first number of items associated with the strip at the first time based at least in part on the first number of the plurality of indicators.

4. The method of claim 3, wherein detecting at least the first number of the plurality of indicators depicted within the first image comprises:
transmitting at least the first image to a computer device over a network, wherein at least the first number of the plurality of indicators is detected by the computer device, and
wherein the method further comprises:
storing an indication that the first number of items is associated with the strip in at least one data store associated with the computer device.

5. The method of claim 3, further comprising:
capturing a second image by the imaging device at a second time, wherein the plurality of indicators is within the field of view of the imaging device at the second time, and wherein the second time follows the first time;
detecting at least a second number of the plurality of indicators depicted within the second image, wherein each of the second number of the plurality of indicators is depicted as activated within the first image, and wherein the second number of the plurality of indicators depicted within the second image is different from the first number of the plurality of indicators depicted within the first image; and
determining a second number of items associated with the strip at the second time based at least in part on the second number of the plurality of indicators.

6. The method of claim 3, wherein at least a first end of the strip is coupled to a storage unit, and
wherein each of the plurality of locations on the strip is provided between the first end of the strip and a second end of the strip.

7. The method of claim 3, wherein at least a second number of items is stored within the storage unit at the first time, and
wherein each of the first number of items associated with the strip at the first time is a complement to at least one of the second number of items stored within the storage unit.

8. The method of claim 6, wherein the storage unit comprises at least one of a set of shelves, a refrigerated cooler, a gondola rack, or a wall.

9. The method of claim 3, wherein the strip is formed at least in part from one or more of a plastic, a steel, an aluminum or a composite, and
wherein each location of the plurality of locations comprises one of a clip or a hook formed integral to the strip.

10. The method of claim 3, wherein the strip comprises a chain having a plurality of links, wherein at least one of the links is formed from at least one metal, and wherein each location of the plurality of locations comprises one of a clip or a hook attached to at least one of the links.

11. The method of claim 3, wherein the plurality of indicators is arranged in an array having at least two columns and at least two rows.

12. The method of claim 3, wherein detecting at least the first number of the plurality of indicators depicted as activated within the first image comprises:

recognizing a pattern of the first number of the plurality of indicators depicted as activated within the first image, wherein the first number of items associated with the strip at the first time is determined based at least in part on the pattern.

13. The method of claim 3, wherein each of the indicators comprises at least one of:

an incandescent bulb;
a light-emitting diode;
a fluorescent bulb; or
a portion of an electronic ink display.

14. The method of claim 3, wherein each indicator of the plurality of indicators is configured to emit light at a wavelength or in a color, and wherein detecting at least the first number of the plurality of indicators depicted as activated within the first image comprises:

recognizing at least one pixel in the first image having the wavelength or the color.

15. The method of claim 3, wherein detecting at least the first number of the plurality of indicators depicted within the first image comprises:

detecting a first indicator depicted within the first image, wherein the first indicator is one of the first number of indicators, and wherein determining at least the first number of items associated with the strip at the first time comprises:

determining that the first indicator is associated with a first location on the strip;

determining that the first indicator is associated with a type of item; and determining that at least one item of the type is associated with the strip at the first time.

16. The method of claim 3, wherein each of the plurality of illuminators is disposed within a display unit comprising a housing and at least one power supply, wherein each of the plurality of illuminators is visible within a face of the housing, and wherein the face of the housing is within the field of view of the imaging device at the first time.

17. The method of claim 16, wherein at least one of a bar code or a set of alphanumeric characters is provided on the first face of the housing, and wherein the method further comprises:

detecting the at least one of the bar code or the set of alphanumeric characters depicted within the first image;

identifying at least one of a type of the first number of items or a location within a materials handling facility based at least in part on the at least one of the bar code or the set of alphanumeric characters;

determining that at least the first number of items is at the location within the materials handling facility at the first time.

18. An item distribution system comprising:

a strip having a first end and a second end;

a plurality of coupling features, wherein each one of the plurality of coupling features is provided at a discrete location on the strip between the first end and the second end;

a plurality of switches, wherein each one of the plurality of switches is associated with one of the plurality of coupling features, and wherein each one of the plurality of switches is configured to complete a circuit for activating one of a plurality of indicators when an item is joined to a corresponding one of the plurality of coupling features; and a display unit, wherein the display unit comprises a housing and at least one power supply, wherein each of the plurality of indicators is visible within a face of the housing, and wherein the face of the housing is within a field of view of an imaging device.

19. The item distribution system of claim 18, wherein at least the first end of the strip is mounted to a portion of a storage unit.

20. The item distribution system of claim 19, wherein the display unit is mounted on the storage unit above the first end of the strip.

* * * * *